United States Patent
Ishidera et al.

(10) Patent No.: US 7,831,846 B2
(45) Date of Patent: Nov. 9, 2010

(54) INFORMATION PROCESSING DEVICE WITH AN ACCELERATION SENSOR

(75) Inventors: Nobutaka Ishidera, Kawasaki (JP); Yosuke Konaka, Kawasaki (JP); Nobuyuki Koike, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 898 days.

(21) Appl. No.: 11/709,247

(22) Filed: Feb. 22, 2007

(65) Prior Publication Data

US 2007/0205982 A1    Sep. 6, 2007

(30) Foreign Application Priority Data

Mar. 1, 2006    (JP)    ............... 2006-055327

(51) Int. Cl.
*G06F 11/00* (2006.01)
*G06F 11/30* (2006.01)

(52) U.S. Cl. ............... 713/300; 713/310; 713/320; 713/323; 713/330; 73/488; 702/85

(58) Field of Classification Search .......... 713/300, 713/310, 320, 323, 330; 73/488; 702/85
See application file for complete search history.

(56) References Cited

U.S. PATENT DOCUMENTS

| | | | |
|---|---|---|---|
| 6,374,157 B1 | 4/2002 | Takamura | 700/245 |
| 6,681,162 B2 * | 1/2004 | Okimoto | 701/34 |
| 6,933,923 B2 * | 8/2005 | Feinstein | 345/158 |
| 7,308,587 B2 | 12/2007 | Inui et al. | 713/310 |
| 2003/0197597 A1 * | 10/2003 | Bahl et al. | 340/7.58 |
| 2005/0022039 A1 | 1/2005 | Inui et al. | |
| 2005/0136994 A1 | 6/2005 | Bahl et al. | 455/574 |
| 2005/0229720 A1 | 10/2005 | Hanazawa et al. | |
| 2006/0019724 A1 | 1/2006 | Bahl et al. | |
| 2006/0112754 A1 | 6/2006 | Yamamoto et al. | 73/1.38 |
| 2006/0176372 A1 * | 8/2006 | Moriya | 348/208.4 |
| 2007/0036348 A1 * | 2/2007 | Orr | 379/424 |

(Continued)

FOREIGN PATENT DOCUMENTS

CN    1309597    8/2001

(Continued)

OTHER PUBLICATIONS

Office Action issued Jul. 18, 2008 in corresponding Chinese Patent Application No. 200710086102X (18 pp including translation).

*Primary Examiner*—Thomas Lee
*Assistant Examiner*—Michael J Brown
(74) *Attorney, Agent, or Firm*—Staas & Halsey LLP

(57) ABSTRACT

The operating state of a computer is switched only when moving of the computer is detected. An information processing device has a detection unit, which detects, as a lifting action, a fact that an accelerated velocity has been kept applied in one direction for a given period of time, and a control unit, which executes a predetermined control operation that is associated with the lifting action detected by the detection unit. A lifting action detecting method has a detection step of detecting, as a lifting action, the fact that an accelerated velocity has been kept applied in one direction for a given period of time, and a control step of executing a predetermined control operation that is associated with the lifting action detected in the detection step.

12 Claims, 17 Drawing Sheets

U.S. PATENT DOCUMENTS

2008/0033679 A1 2/2008 Yamada et al. ............ 702/95

FOREIGN PATENT DOCUMENTS

| JP | 07-028573 | 1/1995 |
| JP | 08-030448 | 2/1996 |
| JP | 08-062249 | 3/1996 |
| JP | 09-006473 | 1/1997 |
| JP | 9-120323 | 5/1997 |
| JP | 2003-345476 | 12/2003 |
| JP | 2004-119624 | 4/2004 |
| JP | 2005-004544 | 1/2005 |
| JP | 2005-315826 | 11/2005 |
| KR | 10-2004-0107376 | 12/2004 |
| WO | 2004/091400 | 10/2004 |
| WO | 2006/016671 | 2/2006 |

* cited by examiner

INFORMATION PROCESSING DEVICE WITH AN ACCELERATION SENSOR

BACKGROUND OF THE INVENTION

The present invention relates to an information processing device with an acceleration sensor.

There is a method of recording the state of a computer immediately before the computer is powered off, and when the computer is turned back on, restoring the computer to the state immediately before the turning off of the computer. This is called a standby state (suspend) or a sleep state (hibernation). By switching the operating state of the computer, the power consumption of the computer is reduced. The computer may have an acceleration sensor, which detects moving of the computer. When it is detected that the computer has been moved, the operating state of the computer is switched. A switch in operating state of the computer is made also when a physical impact to the computer is detected. Alternatively, the operating state of the computer is switched in order to protect the computer from the physical impact.

[Patent document 1] JP 07-28573 A

[Patent document 2] JP 09-120323 A

[Patent document 3] JP 2003-345476 A

[Patent document 4] JP 2005-4544 A

[Patent document 5] JP 08-30448 A

[Patent document 6] JP 08-62249 A

[Patent document 7] JP 09-6473 A

[Patent document 8] JP 2004-119624 A

[Patent document 9] JP 2005-315826 A

SUMMARY OF THE INVENTION

Prior art, in which the operating state of a computer is switched when a physical impact on the computer is detected in addition to when the computer is detected to have been moved, does not have the option of switching the operating state of the computer only when moving of the computer is detected. An object of the present invention is to switch the operating state of a computer only when the computer is detected to have been moved by detecting moving of the computer and a physical impact on the computer separately.

The present invention adopts the following means in order to solve the problems.

An information processing device according to the present invention (the information processing device) comprises a detection unit, which detects, as a lifting action, the fact that an accelerated velocity has been kept applied in one direction for a given period of time, and a control unit, which executes a predetermined control operation that is associated with the lifting action detected by the detection unit. This configuration enables the information processing device to detect whether or not an accelerated velocity that is applied to the information processing device corresponds to the information processing device lifting action. As a result, a control operation associated with the information processing device lifting action is executed only when the information processing device lifting action is detected.

In the information processing device, the control operation may be for putting at least some of components of the information processing device out of operation. This configuration enables the information processing device to switch the operating state.

In the information processing device, the detection unit may detect the lifting action when the accelerated velocity is within a given range. This configuration enables the information processing device to discriminate an accelerated velocity that corresponds to the information processing device lifting action from an accelerated velocity that does not correspond to the information processing device lifting action.

A lifting action detecting method according to the present invention comprises a detection step of detecting, as a lifting action, the fact that an accelerated velocity has been kept applied in one direction for a given period of time, and a control step of executing a predetermined control operation that is associated with the lifting action detected in the detection step. This configuration makes it possible to detect whether or not an applied accelerated velocity corresponds to the lifting action. As a result, a control operation associated with the lifting action is executed only when the lifting action is detected.

A program according to the present invention causes a computer to execute a detection step of detecting, as a lifting action, the fact that an accelerated velocity in one direction has lasted a given period of time, and a notification step of notifying an application program of the lifting action detected in the detection step. This configuration makes it possible to detect whether or not an applied accelerated velocity corresponds to the lifting action.

The information processing device is connected to an acceleration sensor capable of detecting at least an accelerated velocity along one axis, and comprises: a correction instruction input unit in which a correction instruction from a user is entered; an acceleration measuring unit which uses the acceleration sensor in response to the correction instruction to obtain, more than once, a measurement value about at least an accelerated velocity that is applied, more than once, to the information processing device along one axis; a measurement value judging unit which judges whether the measurement values obtained through measurement by the acceleration measuring unit are within a specific range; and a correction value creating unit which, when the measurement values are judged to be within the specific range by the measurement value judging unit, creates a correction value for the acceleration sensor based on the measurement values. This configuration makes it possible to execute correction for more accurate detection of a measurement value about an accelerated velocity that is applied to the information processing device when a user issues a correction instruction. The configuration also makes it possible to execute correction for more accurate detection of a measurement value about an accelerated velocity that is applied to the information processing device when the measurement value about the accelerated velocity that is applied to the information processing device is within a specific range.

The information processing device may further comprise a maximum value judging unit which judges whether or not the measurement values are equal to or smaller than a first value. The information processing device may still further comprise a minimum value judging unit which judges whether or not the measurement values are equal to or larger than a second value. The information processing device may yet further comprise a self-diagnostic driver which applies voltage to a line that connects the acceleration sensor to the information processing device.

A correction method according to the present invention is a method of correcting an information processing device that is connected to an acceleration sensor capable of detecting at least an accelerated velocity along one axis, and comprises: a correction instruction input step in which a correction instruction from a user is entered; an acceleration measuring step of using the acceleration sensor in accordance with the correction instruction to obtain, more than once, a measurement value about at least an accelerated velocity that is applied, more than once, to the information processing device along one axis; a measurement value judging step of judging whether the measurement values obtained through measurement in the acceleration measuring step are within a specific range; and a correction value creating step of creating, when the measurement values are judged to be within the specific range in the measurement value judging step, a correction value for the acceleration sensor based on the measurement values. This configuration makes it possible to execute correction for more accurate detection of a measurement value about an accelerated velocity that is applied to the information processing device when a user issues a correction instruction. The configuration also makes it possible to execute correction for more accurate detection of a measurement value about an accelerated velocity that is applied to the information processing device when the measurement value about the accelerated velocity that is applied to the information processing device is within a specific range.

The present invention can be a method of making a computer or other devices or machines execute any of the processing. The present invention can be a program that causes a computer or other devices or machines to execute any of the functions. Also, the present invention can be a recording medium in which the program is recorded in a manner that allows a computer or the like to read the program.

According to the present invention, the operating state of a computer is switched only when the computer is detected to have been moved.

DETAILED DESCRIPTION OF THE INVENTION

Figure 1:
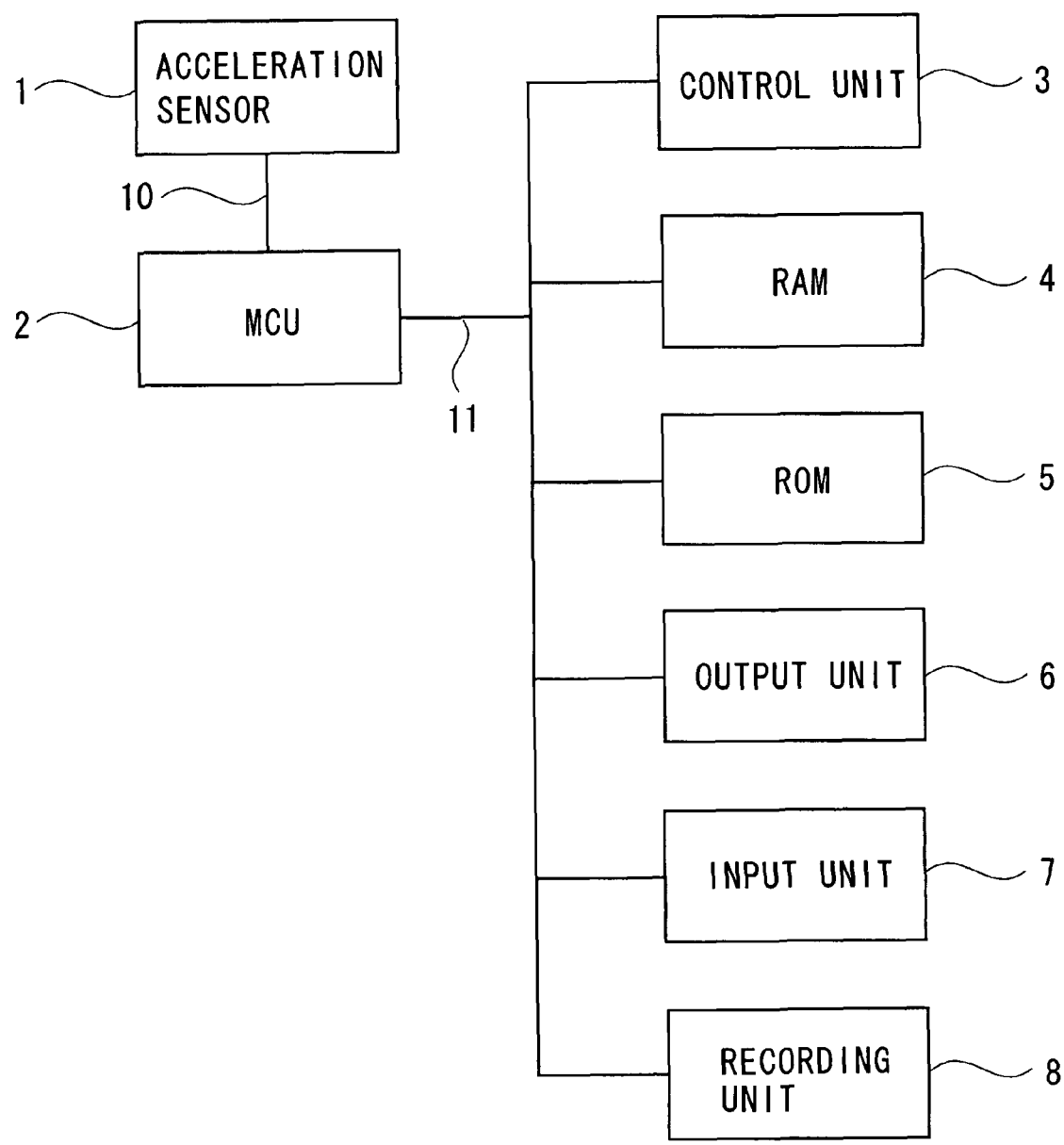
FIG. 1 is a hardware block diagram of an information processing device according to an embodiment of the present invention.

A description given below with reference to drawings is about the best mode of carrying out the present invention (hereinafter referred to as embodiment). The configuration of the following embodiment is shown just for exemplification purpose, and is not meant to limit the present invention.

Gist of the Invention

Piezoelectric gyro sensors are one of sensors that detect the accelerated velocity. Piezoelectric gyro sensors detect a change in posture from accelerated velocities along an X axis, a Y axis, and a Z axis, and from a change in accelerated velocity with time. It is therefore necessary for a piezoelectric gyro sensor to have another sensor determine which angle is the absolute posture of the piezoelectric gyro sensor at an initial state, so a displacement amount from the determined value is obtained as posture information.

A gyro sensor mounted to a notebook PC, a PDA, or other information processing devices increases power consumption if it continues to operate while the information processing device is being turned off or in a suspend mode. Further, to obtain posture information with a piezoelectric gyrosensor, a user has to notify the information processing device of the absolute posture each time the information processing device is turned on, or another sensor is needed to establish the initial state.

A piezoelectric gyro sensor in a navigation system obtains a default value through GPS information, a geomagnetic sensor, or the like when the navigation system is activated, or at other times. The obtained default value is used as the reference and the displacement amount from the reference is added up, with the result that a detailed posture change is calculated accurately. However, a posture detecting measure by way of a piezoelectric gyro sensor requires an absolute position detecting measure (GPS or geomagnetic sensor), and accordingly increases the burden of the cost.

A piezoresistive acceleration sensor is composed of a piezoresistive device and a bell-shaped weight. A force applied to the bell-shaped weight, in other words, a force caused by a tilt in posture of the acceleration sensor is detected by the piezoresistive device, which serves as a displacement sensor. In this method, a tilt in posture of the acceleration sensor is continuously applied to the piezoresistive device through the bell, which enables the acceleration sensor to detect gravity. The absolute posture of the acceleration sensor is obtained as a result. The term "absolute posture" refers to the posture of the acceleration sensor with respect to the direction of gravity.

A piezoresistive acceleration sensor can break if its piezoresistive film is pierced. A signal output from the broken piezoresistive acceleration sensor shows an abnormal value which is either the maximum voltage or the minimum voltage. Another way to calculate the absolute posture is to measure an amount in which a capacitance plate (comb electrode) is shifted physically by gravity. A capacitance plate has a three-dimensional structure that is formed by fine machining according to semiconductor processing technology. An acceleration sensor using a capacitance plate has a problem in that the electrode can be caught on something or deformed. This makes it difficult for the acceleration sensor using a capacitance plate to discriminate among simple non-linear output with respect to the posture angle, a trouble such as a posture drift, and a change in posture. Accordingly, malfunction of an acceleration sensor using a capacitance plate is not as easily detected as a broken piezoresistive acceleration sensor.

Further, with a piezoresistive acceleration sensor, the absolute posture of the piezoresistive acceleration sensor can be obtained at low cost. Measurement using a piezoresistive acceleration sensor costs less than measurement that uses two sensors, a piezoelectric gyro sensor and an absolute position detecting measure (e.g., GPS or geomagnetic sensor).

FIG. 1 is a hardware block diagram of an information processing device according to the embodiment. As shown in FIG. 1, the information processing device is composed of an acceleration sensor 1, an MCU (Micro Controller Unit) 2, a control unit 3, a RAM (Random Access Memory) 4, a ROM (Read Only Memory) 5, an output unit 6, an input unit 7, a recording unit 8, and a display unit 9. The acceleration sensor 1 and the MCU 2 are connected to each other via a signal line 10. The MCU 2, the control unit 3, the RAM 4, the ROM 5, the output unit 6, the input unit 7, the recording unit 8, and the display unit 9 are interconnected via a bus 11.

The control unit 3 is a CPU (Central Processing Unit) or the like, and executes various types of processing in accordance with programs recorded in the ROM 5. The ROM 5 records programs and parameters necessary for the information processing device to function. The RAM 4 temporarily stores some of programs of an operating system and application programs that are executed by the control unit 3. The recording unit 8 is used as external storage of the RAM 4. The input unit 7 is, for example, a keyboard and a mouse, and is operated to enter a given command or necessary data. The output unit 6 involves, for example, a display device such as a CRT (Cathode Ray Tube) display, a liquid crystal display, or a plasma display, an audio output device such as a speaker, and a printer or a similar output device.

The information processing device according to the embodiment can be a desktop personal computer or a portable computer, for example, a notebook personal computer, a PDA (Personal Digital Assistance), or a CE (Consumer Electronics) machine.

Figure 2:
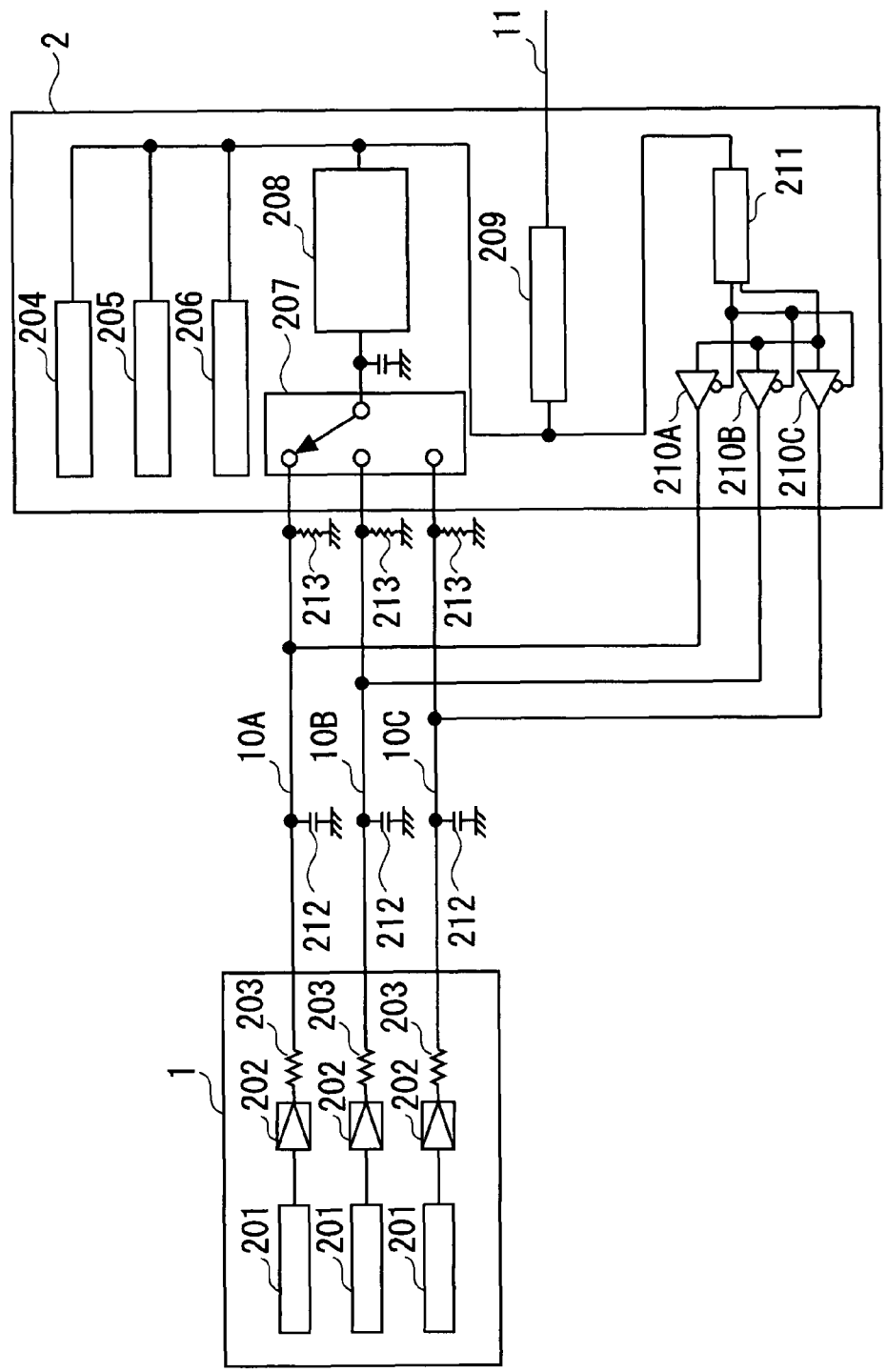
FIG. 2 is a diagram showing the configurations of an acceleration sensor 1 and an MCU 2 according to the embodiment.

FIG. 2 is a diagram showing the configurations of the acceleration sensor 1 and the MCU 2 according to the embodiment. The acceleration sensor 1 involves an acceleration sensor device 201, a sense amplifier 202, and an output resistor 203. The MCU 2 involves a register 209, a multiplexer 207, an A/D converter 208, a processing unit 204, an NV-ROM 205, a RAM 206, a self-diagnostic driver 210, and a self-diagnosis control register 211.

The acceleration sensor 1 detects a voltage (change in voltage) applied to the acceleration sensor device 201. The acceleration sensor 1 outputs a voltage applied to the acceleration sensor device 201 to the MCU 2 as a voltage value. The voltage value that the acceleration sensor 1 outputs is amplified by the sense amplifier 202. The voltage value that the acceleration sensor 1 outputs is input to the multiplexer 207 via a signal line 10A, a signal line 10B, and a signal line 10C (hereinafter, term "signal line 10" encompasses all of signal line 10A, signal line 10B, and signal line 10C). Voltage values input to the multiplexer 207 are read in order and converted into digital values by the A/D converter 208. The voltage values converted into digital values are input to the processing unit 204. A capacitor 212 is interposed between the signal line 10 and a ground. A self-diagnosis detection resistor 213 is also placed between the signal line 10 and the ground. The presence of the self-diagnosis detection resistor 213 minimizes a voltage value entered in the processing unit 204 when a path is cut at a point along the signal line 10 leading from the acceleration sensor 1 to the self-diagnosis detection resistor 213.

The acceleration sensor 1 according to the embodiment is capable of outputting an accelerated velocity that is applied in an axial direction as a numerical value. In other words, how much accelerated velocity is being applied in one direction with respect to the body of the acceleration sensor 1 is expressed in numerical value.

Figure 3:
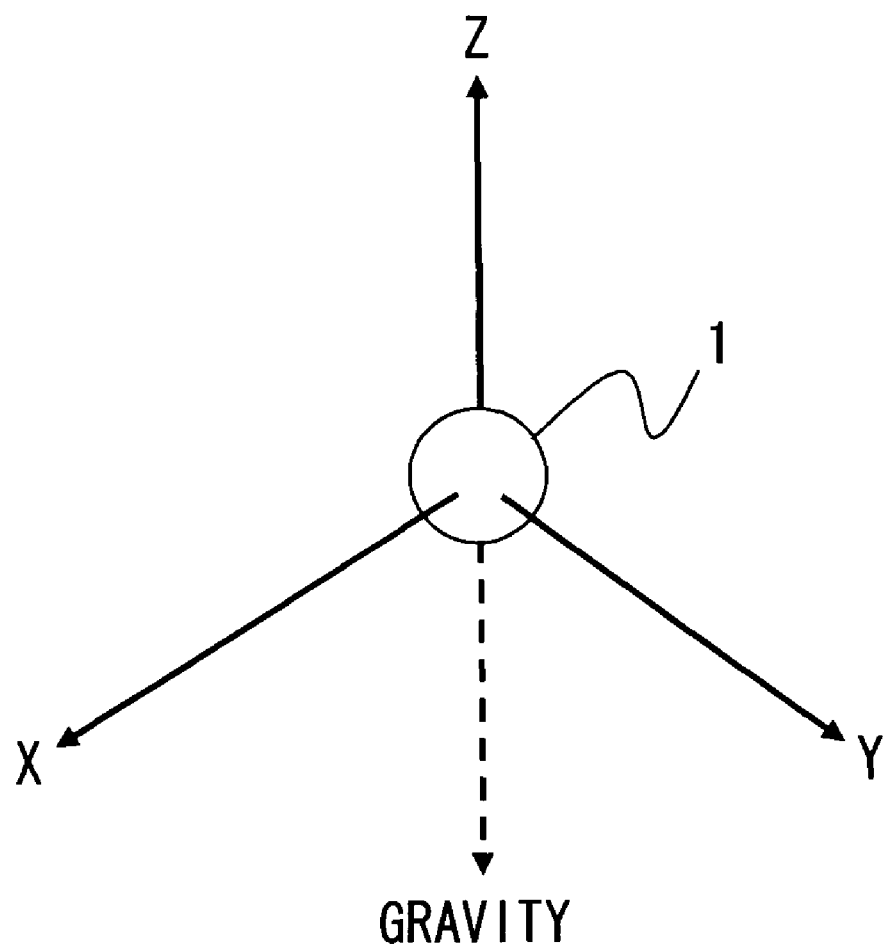
FIG. 3 is an explanatory diagram of the acceleration sensor 1 which detects accelerated velocities applied along an X axis, a Y axis, and a Z axis.

FIG. 3 is an explanatory diagram of the acceleration sensor 1 which detects accelerated velocities applied along an X axis, a Y axis, and a Z axis. As shown in FIG. 3, the Z axis is parallel to the direction of gravity. The X axis and the Y axis are orthogonal to the Z axis. The acceleration sensor 1 has one acceleration sensor device 201 for each of the X-axis, Y-axis, and Z-axis directions of FIG. 3. In a case where the acceleration sensor 1 is a piezoresistive (diffused resistance) acceleration sensor, an accelerated velocity applied to the acceleration sensor device 201 changes the resistance value of the acceleration sensor device 201, thereby changing the voltage applied to the acceleration sensor device 201. When gravity (corresponds to accelerated velocity of $9.8 \text{ m/s}^2$) is applied in a direction of one of the arrows, the acceleration sensor 1 detects a voltage change corresponding to an accelerated velocity that is applied to the acceleration sensor device 201.

The processing unit 204 calculates accelerated velocities that are applied along the X axis, the Y axis, and the Z axis from changes in voltage applied to the acceleration sensor devices 201. When accelerated velocities are applied along the X axis, the Y axis, and the Z axis in the directions of the arrows indicated by the solid lines, the processing unit 204 calculates plus values as the accelerated velocities, and records the calculated accelerated velocities in the register 209. When an accelerated velocity is applied along the Z axis in the direction of the arrow indicated by the dashed line (namely, in direction of gravity), the processing unit 204 calculates a minus value as the accelerated velocity, and records the calculated accelerated velocity in the register 209.

Since the processing unit 204 calculates a plus value as an accelerated velocity that is applied along the Z axis in the direction of the arrow indicated by the solid line (namely, in opposite direction of gravity) of FIG. 3, the processing unit 204 can discriminate an accelerated velocity that is applied along the Z axis in the direction of the arrow indicated by the solid line (opposite direction of gravity) from any other accelerated velocity.

Figure 4A:
FIGS. 4A to 4D are exterior views of the acceleration sensor 1 according to the embodiment.
Figure 4B:
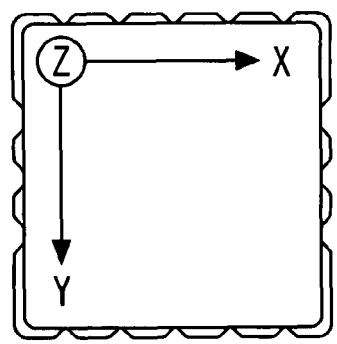
Figure 4C:
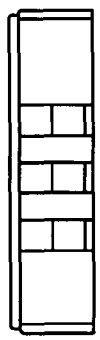
Figure 4D:
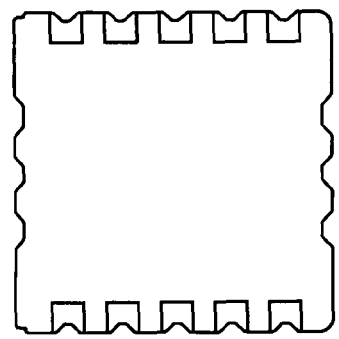

FIGS. 4A to 4D are exterior views of the acceleration sensor 1 according to the embodiment. FIG. 4A is a frontal view of the acceleration sensor 1. FIG. 4B is a top view of the acceleration sensor 1. FIG. 4C is a side view of the acceleration sensor 1. FIG. 4D is a bottom view of the acceleration sensor 1. The acceleration sensor 1 of FIGS. 4A to 4D is shown for exemplification purpose only, and is not intended to limit the acceleration sensor 1 of the present invention.

<Function Outline>

Figure 5:
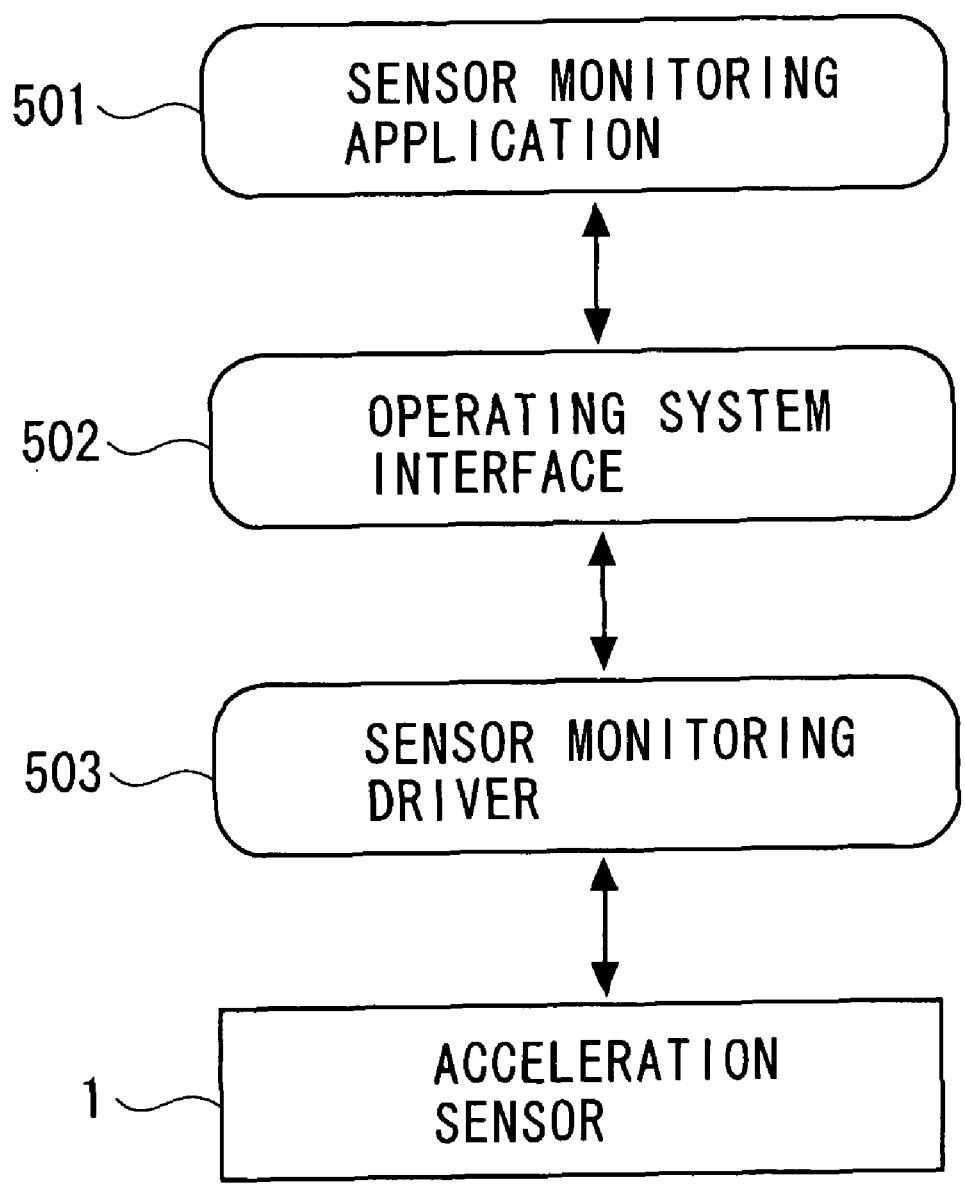
FIG. 5 is a diagram showing a function block of a sensor monitoring function which is provided in the information processing device according to the embodiment.

FIG. 5 is a diagram showing a function block of a sensor monitoring function which is provided in the information processing device. A sensor monitoring application 501 is a program loaded from the recording unit 8 onto the RAM 4 to be executed and controlled by the control unit 3. The sensor monitoring application 501 receives an event from a sensor monitoring driver 503 via an operating system interface 502.

Receiving an event from the sensor monitoring driver 503, the sensor monitoring application 501 switches the operating state of the computer via the operating system interface 502.

The operating system interface 502 is an application interface of the operating system. The operating system interface 502 provides applications with any interfaces to the operating system including one for application-driver communications and one for power control of the operating system.

The sensor monitoring driver 503 is a program loaded from the recording unit 8 onto the RAM 4 to be executed and controlled by the control unit 3. The sensor monitoring driver 503 receives, as an event, a given voltage value that the acceleration sensor 1 outputs. Receiving, as an event, a given voltage value that the acceleration sensor 1 outputs, the sensor monitoring driver 503 sends the event to the sensor monitoring application 501 via the operating system interface 502.

Figure 6:
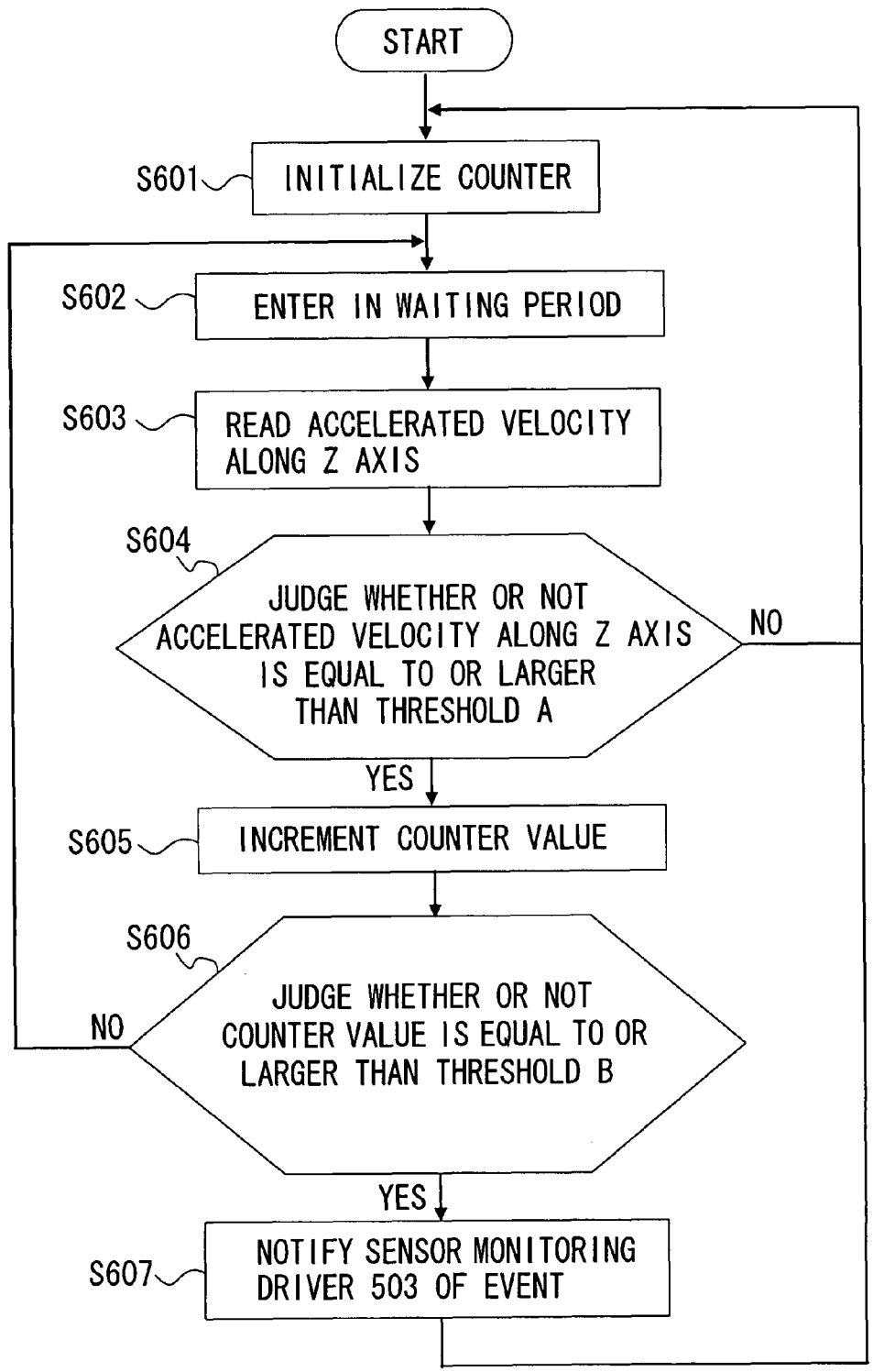
FIG. 6 is a flow chart for processing of notifying a sensor monitoring driver 503 of a detection of lifting of the acceleration sensor 1 according to the embodiment.

FIG. 6 illustrates processing of notifying the sensor monitoring driver 503 of a detection of lifting of the acceleration sensor 1 according to the embodiment. First, the control unit 3 initializes a not-shown counter (S601). Specifically, the control unit 3 sets the counter value to 0.

Next, the control unit 3 enters a waiting period (S602). In a waiting period, the control unit 3 stops processing of reading out of the MCU 2 for a given length of time. Inserting a waiting period enables the control unit 3 to perform the processing of reading out of the MCU 2 at regular intervals. For instance, if the length of the waiting period is set to 10 ms, the control unit 3 performs the processing of reading out of the MCU 2 at 10-ms intervals. The control unit 3 then reads out of the MCU 2 (S603). Specifically, the control unit 3 reads a record in the register 209 about an accelerated velocity that is applied along the Z axis.

The control unit 3 judges whether or not the value of the accelerated velocity read out of the MCU 2 is equal to or larger than a given threshold A (S604). For instance, G (1 G=9.8 M/s$^2$) is employed as the unit of accelerated velocity, and the given threshold A is set to 1.25 G (1.25×9.8 m/s$^2$). In this case, the control unit 3 judges whether or not the value of the accelerated velocity read out of the MCU 2 is equal to or larger than 1.25 G (1.25×9.8 M/s$^2$). The value is presented as an example, and the given threshold A can be set to any other value than the value. The given threshold A is a reference value with which whether the acceleration sensor 1 has been lifted is judged. In other words, when the value of the accelerated velocity read out of the MCU 2 is equal to or larger than the given threshold A, it is judged that an accelerated velocity corresponding to lifting of the acceleration sensor 1 has been applied to the acceleration sensor 1. The reference value for judging lifting of the acceleration sensor 1 is obtained in advance through experiments or simulation.

When the value of the accelerated velocity read out of the MCU 2 is equal to or larger than the given threshold A, the control unit 3 increments the value of the counter (S605). In other words, the control unit 3 increases the counter value by 1. When the value of the accelerated velocity read out of the MCU 2 is smaller than the given threshold A, on the other hand, the control unit 3 performs the processing of S601.

Next, the control unit 3 judges whether or not the value of the counter is equal to or larger than a given threshold B (S606). When the value of the counter is equal to or larger than the given threshold B, the control unit 3 notifies the sensor monitoring driver 503 of the fact that the counter value is equal to or larger than the given threshold B. In other words, the control unit 3 notifies the sensor monitoring driver 503 of this fact as an event (S607). After sending the event to the sensor monitoring driver 503, the control unit 3 performs the processing of S601. If the value of the counter becomes equal to or larger than the given threshold B when the processing of S602 to S606 is repeated, it means that an accelerated velocity corresponding to lifting of the acceleration sensor 1 is kept applied to the acceleration sensor 1 for a given length of time.

For example, in a case where the waiting period is set to 10 ms and the given threshold B is set to 3, an accelerated velocity corresponding to lifting of the acceleration sensor 1 is kept applied to the acceleration sensor 1 for 30 ms. Then the control unit 3 sets the counter value to 0 in the processing of S601 and stops reading out of the MCU 2 for 10 ms in the processing of S602. In the processing of S604, the control unit 3 sets the counter value to 1. Since the counter value, 1, is smaller than 3, which is set as the given threshold B, the control unit 3 again performs the processing of S602. The processing of S602 to S606 is repeated, and when the counter value reaches 3, the total length of the waiting periods is 30 ms. At this point, an accelerated velocity of 1.25 G (1.25×9.8 m/s$^2$) or larger has been kept applied to the acceleration sensor 1 for 30 ms if the given threshold A is 1.25 G (1.25×9.8 m/s$^2$).

In the embodiment, a counter value equal to or larger than the given threshold B means that an accelerated velocity corresponding to lifting of the acceleration sensor 1 has been kept applied to the acceleration sensor 1 for a given length of time. Then the sensor monitoring driver 503 is notified of a detection of lifting of the acceleration sensor 1 as an event.

On the other hand, an accelerated velocity value read out of the MCU 2 that is smaller than the given threshold A, or a counter value smaller than the given threshold B, means no lifting of the acceleration sensor 1, and the sensor monitoring driver 503 is not notified of a detection of lifting of the acceleration sensor 1. Then the control unit 3 initializes the counter value and starts detecting whether or an accelerated velocity corresponding to lifting of the acceleration sensor 1 is continuously applied to the acceleration sensor 1 for a given length of time.

Acceleration detection according to the embodiment is capable of discriminating an accelerated velocity that corresponds to lifting of the acceleration sensor 1 from an accelerated velocity that is irrelevant to lifting of the acceleration sensor 1. Therefore, acceleration detection according to the embodiment can discriminate moving of the information processing device from a physical impact on the information processing device. This makes it possible to switch the operating state of the information processing device only when moving of the information processing device is detected.

The given threshold A may be replaced by a given range C. In a case where the given range C is employed instead of the given threshold A, it is judged that an accelerated velocity corresponding to lifting of the acceleration sensor 1 is being applied to the acceleration sensor 1 when the value of the accelerated velocity read out of the MCU 2 is within the given range C. In other words, the control unit 3 judges, in the processing of S604, whether the accelerated velocity value read out of the MCU 2 is within the given range C. Judging whether an accelerated velocity value read out of the MCU 2 is within the given range C makes it possible to judge more minutely whether an accelerated velocity corresponding to lifting of the acceleration sensor 1 is being applied to the acceleration sensor 1.

Figure 7:
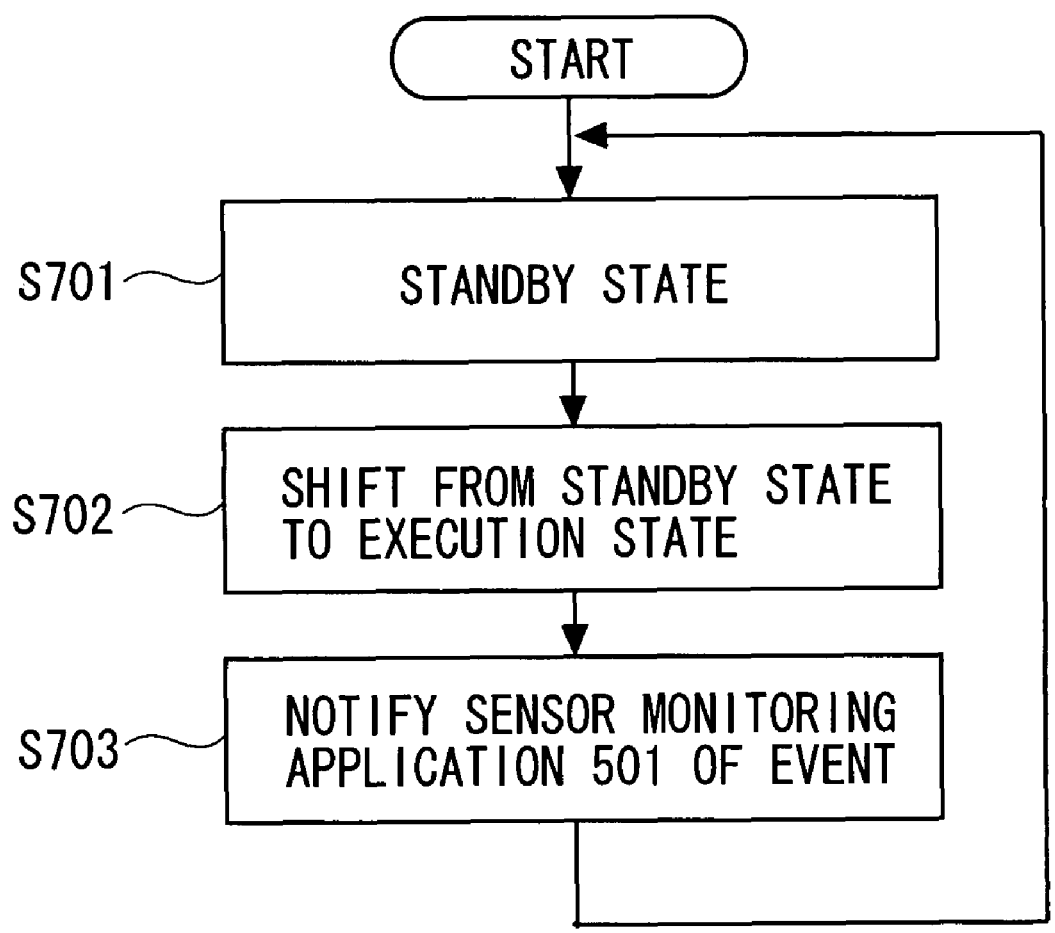
FIG. 7 is a flow chart illustrating the operation of the sensor monitoring driver 503.

FIG. 7 illustrates the operation of the sensor monitoring driver 503. Generally speaking, application software is incapable of accessing hardware directly. The sensor monitoring application 501 in the embodiment therefore accesses the acceleration sensor 1, which is hardware, via the sensor monitoring driver 503. Access between the sensor monitoring driver 503 and the acceleration sensor 1 is accomplished by loading the sensor monitoring driver 503 from the recording unit 8 onto the RAM 4 and having the control unit 3 execute the sensor monitoring driver 503 in the RAM 4.

The sensor monitoring driver 503 is usually in a standby state (S701) in which the sensor monitoring driver 503 waits for an event from the acceleration sensor 1. When an event notification from the acceleration sensor 1 is received in a standby state, the sensor monitoring driver 503 shifts from a standby state to an execution state (S702). In a case where no event notification from the acceleration sensor 1 is received in a standby state, the sensor monitoring driver 503 stays in a standby state.

Once shifted to an execution state, the sensor monitoring driver 503 sends the event to the sensor monitoring application 501 (S703) by notifying the sensor monitoring application 501 of the detection of lifting of the acceleration sensor 1 as an event. After sending the event to the sensor monitoring application 501, the sensor monitoring driver 503 shifts back to a standby state.

Figure 8:
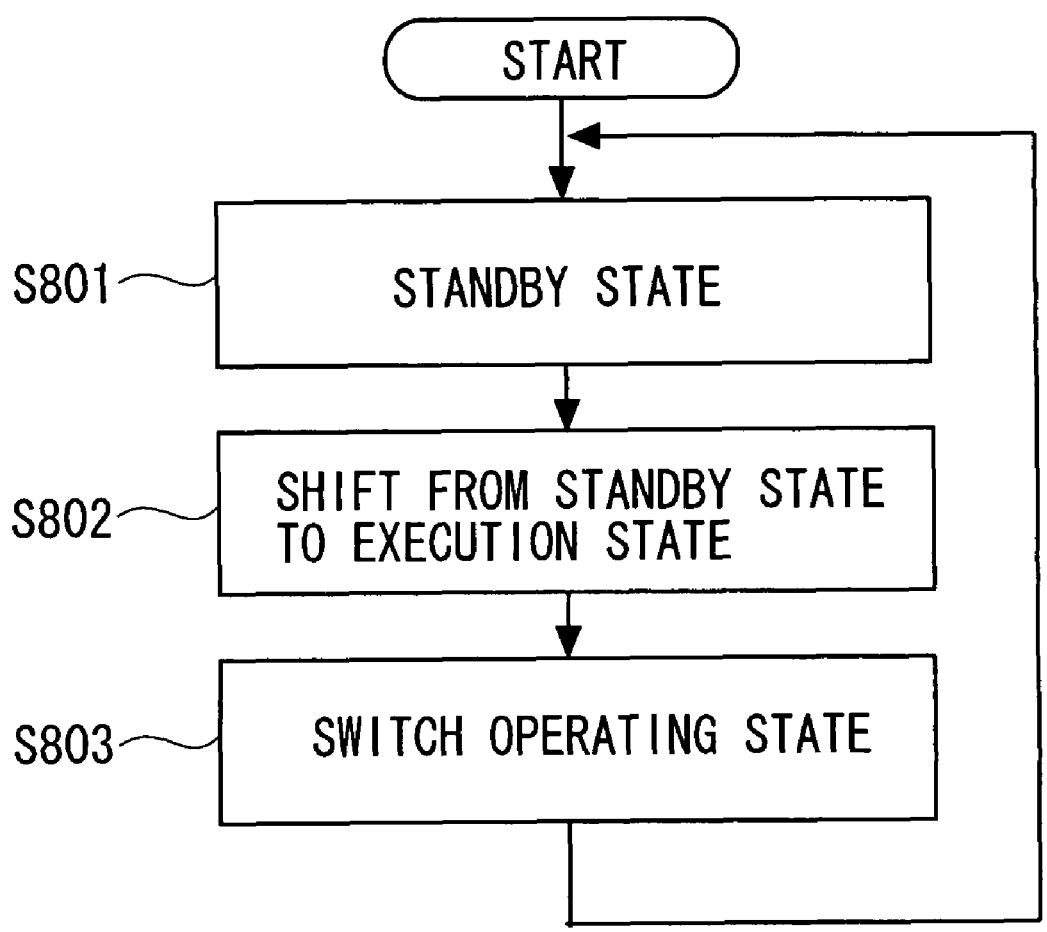
FIG. 8 is a flow chart illustrating the operation of a sensor monitoring application 501.

FIG. 8 illustrates the operation of the sensor monitoring application 501. The operation of the sensor monitoring application 501 is implemented by loading the sensor monitoring application 501 from the recording unit 8 onto the RAM 4 and having the control unit 3 execute the sensor monitoring application 501 in the RAM 4.

The sensor monitoring application 501 is usually in a standby state (S801) in which the sensor monitoring application 501 waits for an event from the sensor monitoring driver 503. When an event notification from the sensor monitoring driver 503 is received in a standby state, the sensor monitoring application 501 shifts from a standby state to an execution state (S802). In a case where no event notification from the sensor monitoring driver 503 is received in a standby state, the sensor monitoring application 501 stays in a standby state.

Once shifted to an execution state, the sensor monitoring application 501 switches the operating state of the information processing device (S803). The operating state of the information processing device is switched with the use of an API (Application Program Interface) of basic software such as an operating system. After switching the operating state of the information processing device, the sensor monitoring application 501 shifts back to a standby state.

While an accelerated velocity generated in the Z-axis direction is detected as lifting of the information processing device in the embodiment, a lift in an arbitrary direction may be detected by combining a plurality of axes.

<Calibration Processing>

Stress is applied to the acceleration sensor 1 due to residual stress of the information processing device to which the acceleration sensor 1 is mounted and a change with time of the residual stress. Accordingly a voltage value that the acceleration sensor 1 outputs could differ from the voltage value upon shipment of the acceleration sensor 1. In a case where the acceleration sensor 1 outputs a voltage value different from the voltage value upon shipment, namely, an abnormal voltage value, the posture of the acceleration sensor 1 cannot be detected accurately. An abnormal voltage value that the acceleration sensor 1 outputs can be corrected, but the stress causes the voltage value to fluctuate again, thereby necessitating another correction of voltage value output from the acceleration sensor 1. Processing of correcting a voltage value that the acceleration sensor 1 outputs is called calibration processing.

Figure 9:
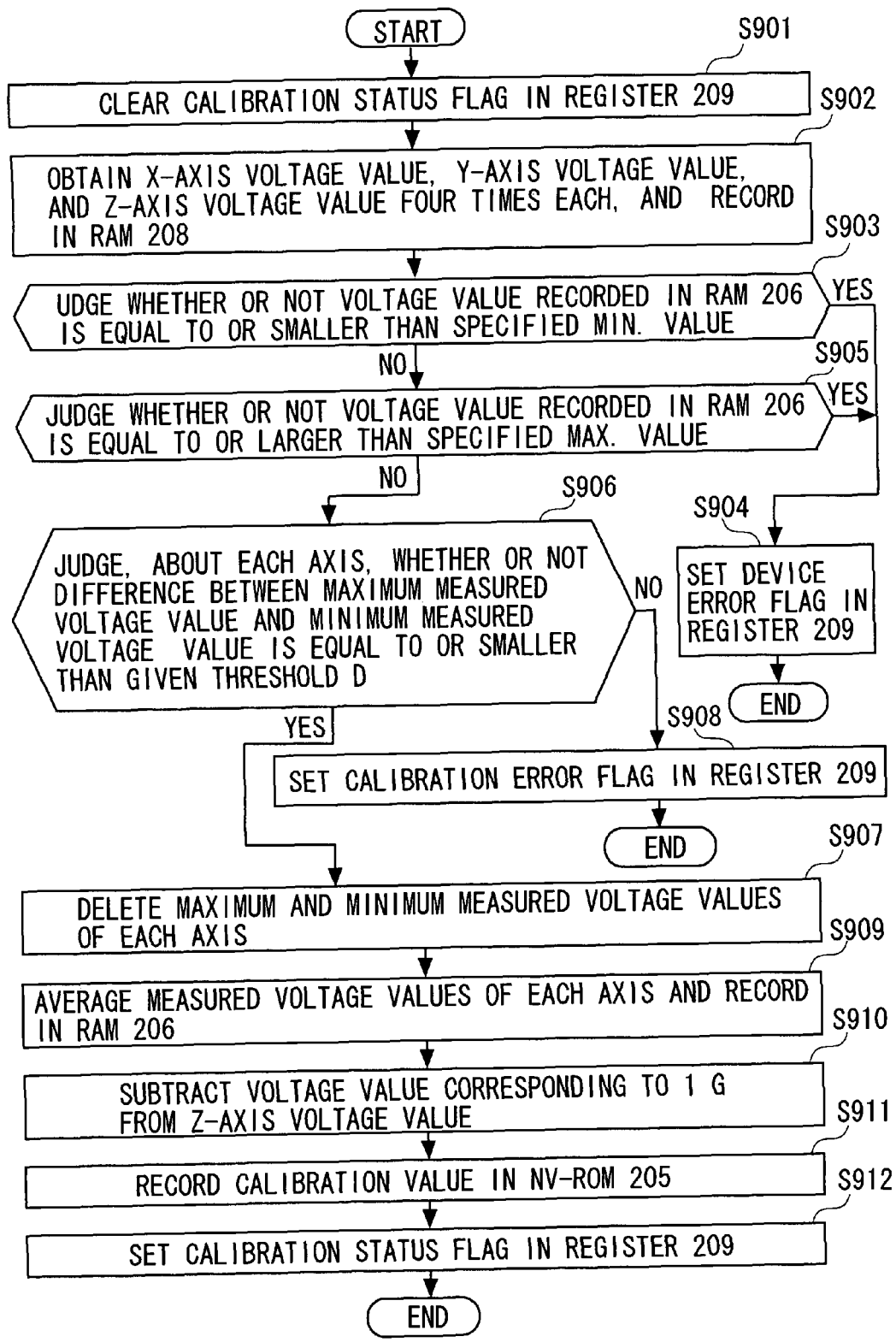
FIG. 9 is a flow chart illustrating calibration processing.
Figure 14:
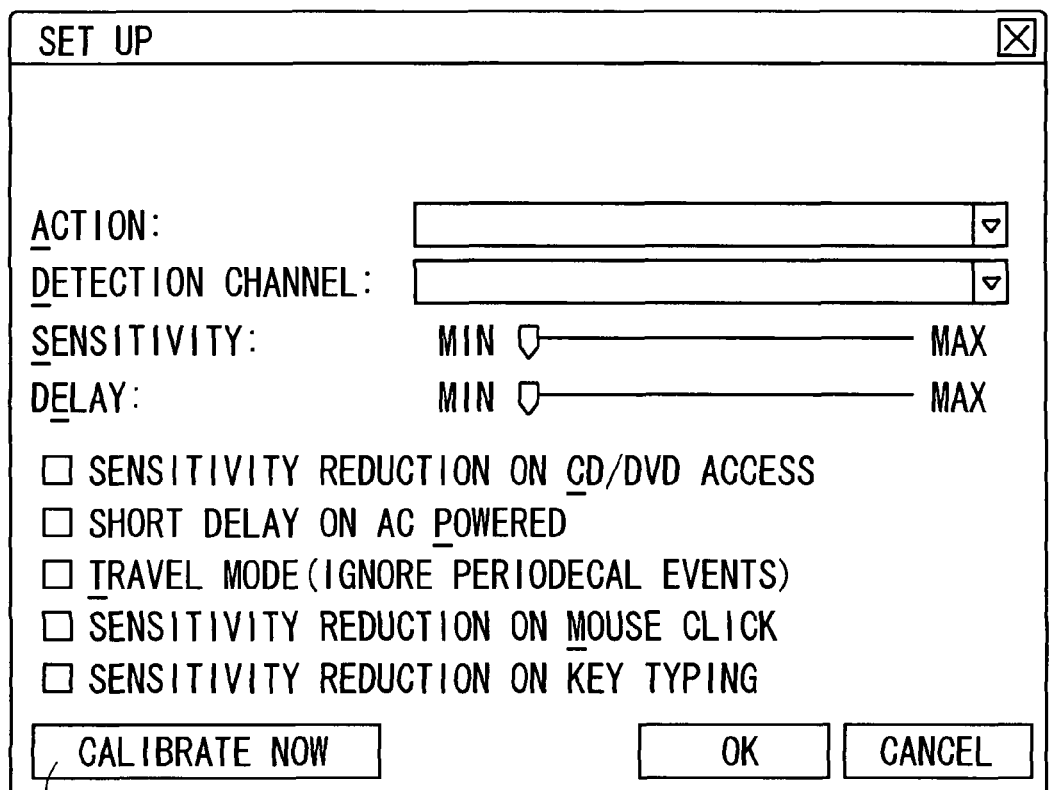
FIG. 14 is a flow chart showing an example of a calibration setting screen.

FIG. 9 is a flow chart illustrating the calibration processing. The calibration processing is carried out when the MCU 2 receives a calibration command. Specifically, a user presses a calibration button provided by the operating system interface 502, thereby executing the calibration processing. The premise of the calibration processing is that the user arranges the information processing device such that the Z axis of the acceleration sensor 1 is parallel to the direction of gravity. When the calibration button is pressed, the control unit 3 notifies, via the bus 11, the MCU 2 of the press of the calibration button. For instance, the calibration processing is executed when a button 1401 is pushed on a calibration setting screen shown in FIG. 14.

First, notified of the press of the calibration button, the processing unit 204 in the MCU 2 clears a calibration status flag in the register 209 (S901). Next, the processing unit 204 obtains X-axis, Y-axis, and Z-axis voltage values from voltages output from the acceleration sensor devices 201, and records the obtained values in the RAM 206 (S902). In this case, the processing unit 204 obtains X-axis, Y-axis and Z-axis voltage values four times each, while putting an interval of a few tens of milliseconds between one measurement and next.

The processing unit 204 then judges whether or not the X-axis, Y-axis, and Z-axis voltage values recorded in the RAM 206 are equal to or smaller than a specified Min. value (S903). Specifically, the processing unit 204 compares each of the four X-axis voltage values, four Y-axis voltage values, and four Z-axis voltage values recorded in the RAM 206 against the specified Min. value to determine whether a value equal to or smaller than the specified Min. value is found among the four X-axis voltage values, four Y-axis voltage values, and four Z-axis voltage values recorded in the RAM 206. The specified Min. value is a reference value used to judge whether X-axis, Y-axis, and Z-axis voltage values recorded in the RAM 206 are normal.

As shown in FIG. 2, placing the self-diagnosis detection resistor 213 between the signal line 10 and the ground prevents breakage of the signal line 10 from pushing the A/D converter 208 into a floating state. In other words, the presence of the self-diagnosis detection resistor 213 puts a voltage value that enters the A/D converter 208 at the same level as the reference electric potential (i.e., minimizes voltage value). The voltage value that enters the A/D converter 208 is thus given a minimum value when the signal line 10 is disconnected. On the other hand, the acceleration sensor 1 outputs the minimum or maximum voltage value when malfunctioning. Consequently, when the acceleration sensor 1 is malfunctioning or the signal line 10 is disconnected or otherwise damaged, a voltage value obtained by the processing unit 204 is the maximum or minimum voltage value that the acceleration sensor 1 can output. Accordingly, when the acceleration sensor 1 is working properly and the signal line 10 is neither disconnected nor damaged in any other way, a voltage value larger than the specified Min. value enters the A/D converter 208. In a case where X-axis, Y-axis, and Z-axis voltage values recorded in the RAM 206 are equal to or smaller than the specified Min. value, it means that the acceleration sensor 1 is malfunctioning or the signal line 10 has been disconnected or otherwise damaged. The specified Min. value is recorded in advance in the NV-ROM 205. The specified Min. value is obtained in advance through experiments or simulation.

In a case where a value equal to or smaller than the specified Min. value is found among the X-axis, Y-axis, and Z-axis voltage values recorded in the RAM 206, the processing unit 204 sets a device error flag in the register 209 (S904). The processing unit 204 then ends the calibration processing.

On the other hand, when a value equal to or smaller than the specified Min. value is not found among the X-axis, Y-axis, and Z-axis voltage values recorded in the RAM 206, the processing unit 204 judges whether or not the X-axis, Y-axis, and Z-axis voltage values recorded in the RAM 206 are equal to or larger than a specified Max. value (S905). Specifically, the processing unit 204 compares each of the four X-axis voltage values, four Y-axis voltage values, and four Z-axis voltage values recorded in the RAM 206 against the specified Max. value to determine whether a value equal to or larger than the specified Max. value is found among the four X-axis voltage values, four Y-axis voltage values, and four Z-axis voltage values recorded in the RAM 206. The specified Max. value is a reference value used to judge whether X-axis, Y-axis, and Z-axis voltage values recorded in the RAM 206 are normal.

The acceleration sensor 1 outputs the minimum or maximum voltage value when malfunctioning. Consequently, when the acceleration sensor 1 is malfunctioning, a voltage value obtained by the processing unit 204 is the maximum or minimum voltage value that the acceleration sensor 1 can output. Therefore, when the acceleration sensor 1 is working properly, a voltage value smaller than the specified Max. value enters the A/D converter 208. In a case where X-axis, Y-axis, and Z-axis voltage values recorded in the RAM 206 are equal to or larger than the specified Max. value, it means that the acceleration sensor 1 is malfunctioning. The specified Max. value is recorded in advance in the NV-ROM 205. The specified Max. value is obtained in advance through experiments or simulation.

In a case where a value equal to or larger than the specified Max. value is found among the X-axis, Y-axis, and Z-axis voltage values recorded in the RAM 206, the processing unit 204 performs the processing of S904, namely, sets a device error flag in the register 209. The processing unit 204 then ends the calibration processing.

On the other hand, when a value equal to or larger than the specified Max. value is not found among the X-axis, Y-axis, and Z-axis voltage values recorded in the RAM 206, the processing unit 204 judges, about the X-axis voltage values in the RAM 206, the Y-axis voltage values in the RAM 206, and the Z-axis voltage values in the RAM 206, respectively, whether or not the difference between the maximum value of the four measured voltage values and the minimum value of the four is equal to or smaller than a given threshold D (S906). In other words, the processing unit 204 judges whether or not the difference between the maximum value of the four measured X-axis voltage values that are recorded in the RAM 206 and the minimum value of the four is equal to or smaller than the given threshold D. The processing unit 204 also judges whether or not the difference between the maximum value of the four measured Y-axis voltage values that are recorded in the RAM 206 and the minimum value of the four is equal to or smaller than the given threshold D. The processing unit 204 further judges whether or not the difference between the maximum value of the four measured Z-axis voltage values that are recorded in the RAM 206 and the minimum value of the four is equal to or smaller than the given threshold D.

The processing unit 204 performs, a given number of times, the processing of judging whether or not the difference between the maximum value of the four measured X-axis, Y-axis, or Z-axis voltage values that are recorded in the RAM 206 and the minimum value of the four is equal to or smaller than the given threshold D. In this case, the processing unit 204 uses a not-shown counter to count the given number of times, which can be set arbitrarily. Instead of repeating the processing of judging whether or not the difference between the maximum value of the four measured X-axis, Y-axis, or Z-axis voltage values that are recorded in the RAM 206 and the minimum value of the four is equal to or smaller than the given threshold D a given number of times, the processing unit 204 may perform this judging processing for a given length of time. The processing unit 204 in this case uses a not-shown timer to measure the given length of time, which can be set arbitrarily.

When the difference between the maximum and minimum values of the measured X-axis, Y-axis, or Z-axis voltage values that are recorded in the RAM 206 is equal to or smaller than the given threshold D, the processing unit 204 deletes the maximum and minimum values of the X-axis, Y-axis, or Z-axis voltage values recorded in the RAM 206 (S907). In other words, the processing unit 204 deletes the maximum value of the four measured X-axis voltage values that are recorded in the RAM 206 and the minimum value of the four. The processing unit 204 also deletes the maximum value of the four measured Y-axis voltage values that are recorded in the RAM 206 and the minimum value of the four. The processing unit 204 further deletes the maximum value of the four measured Z-axis voltage values that are recorded in the RAM 206 and the minimum value of the four.

On the other hand, when the difference between the maximum and minimum values of the measured X-axis, Y-axis, or Z-axis voltage values that are recorded in the RAM 206 is larger than the given threshold D, it is judged that vibration or the like hinders normal calibration, and the MCU 2 sets a calibration error flag in the register 209 (S908), and prompts the user to execute the calibration operation again in some place where the information processing device is free from vibrations. The MCU 2 then ends the calibration processing.

Next, the processing unit 204 averages the X-axis voltage values, Y-axis voltage values, and Z-axis voltage values remaining in the RAM 206, respectively, and records the mean values in the RAM 206 (S909). In other words, the processing unit 204 respectively averages the two remaining X-axis voltage values in the RAM 206, the two remaining Y-axis voltage values in the RAM 206 and the two remaining Z-axis voltage values in the RAM 206, and newly records the mean X-axis voltage value, the mean Y-axis voltage value, and the mean Z-axis voltage value in the RAM 206. After recording the mean values, the processing unit 204 deletes the raw measurement X-axis, Y-axis, and Z-axis voltage values from the RAM 206.

The processing unit 204 then subtracts a voltage value corresponding to 1 G ($9.8 \text{ m/s}^2$) from the Z-axis voltage value recorded in the RAM 206 (S910). A voltage value corresponding to 1 G ($9.8 \text{ m/s}^2$) is subtracted from the Z-axis voltage value recorded in the RAM 206 because an accelerated velocity of 1 G ($9.8 \text{ m/s}^2$) is constantly applied along the Z axis.

The processing unit 204 next records calibration values in the NV-ROM 205 (S911). Specifically, values obtained by subtracting an initial X-axis voltage value, an initial Y-axis voltage value and an initial Z-axis voltage value from the X-axis voltage value, Y-axis voltage value, and Z-axis voltage value recorded in the RAM 206, respectively, are recorded in the NV-ROM 205. The initial X-axis voltage value, the initial Y-axis voltage value, and the initial Z-axis voltage value are X-axis, Y-axis, and Z-axis voltage values of when no stress is applied to the acceleration sensor 1. Calibration values are values obtained by subtracting the initial X-axis, Y-axis, and Z-axis voltage values from X-axis, Y-axis, and Z-axis voltage values that are recorded in the RAM 206.

For instance, when the X-axis voltage value recorded in the RAM 206 is 1.5 volt (V) and the initial X-axis voltage value is 1.6 volt (V), the calibration value is 0.1 volt (V), which is obtained by subtracting the X-axis voltage value in the RAM 206, 1.5 volt (V), from the initial X-axis voltage value, 1.6 volt (V). To give another example, when the X-axis voltage value recorded in the RAM 206 is 1.7 volt (V) and the initial X-axis voltage value is 1.6 volt (V), the calibration value is −0.1 volt (V), which is obtained by subtracting the X-axis voltage value in the RAM 206, 1.7 volt (V), from the initial X-axis voltage value, 1.6 volt (V). The initial X-axis, Y-axis, and Z-axis voltage values are measured and recorded in the NV-ROM 205 in advance.

Next, the processing unit 204 sets a calibration status flag in the register 209 (S912). The processing unit 204 ends the calibration processing at this point. Setting a calibration status flag in the register 209 signals the completion of the calibration processing.

Once the calibration processing is completed, a voltage value that the acceleration sensor 1 outputs can now be corrected. The correction makes it possible to detect an accelerated velocity applied to the acceleration sensor 1 with precision and to detect an accurate posture of the acceleration sensor 1.

<Angle Calculation Processing, Tilt Detection Processing>

Figure 10:
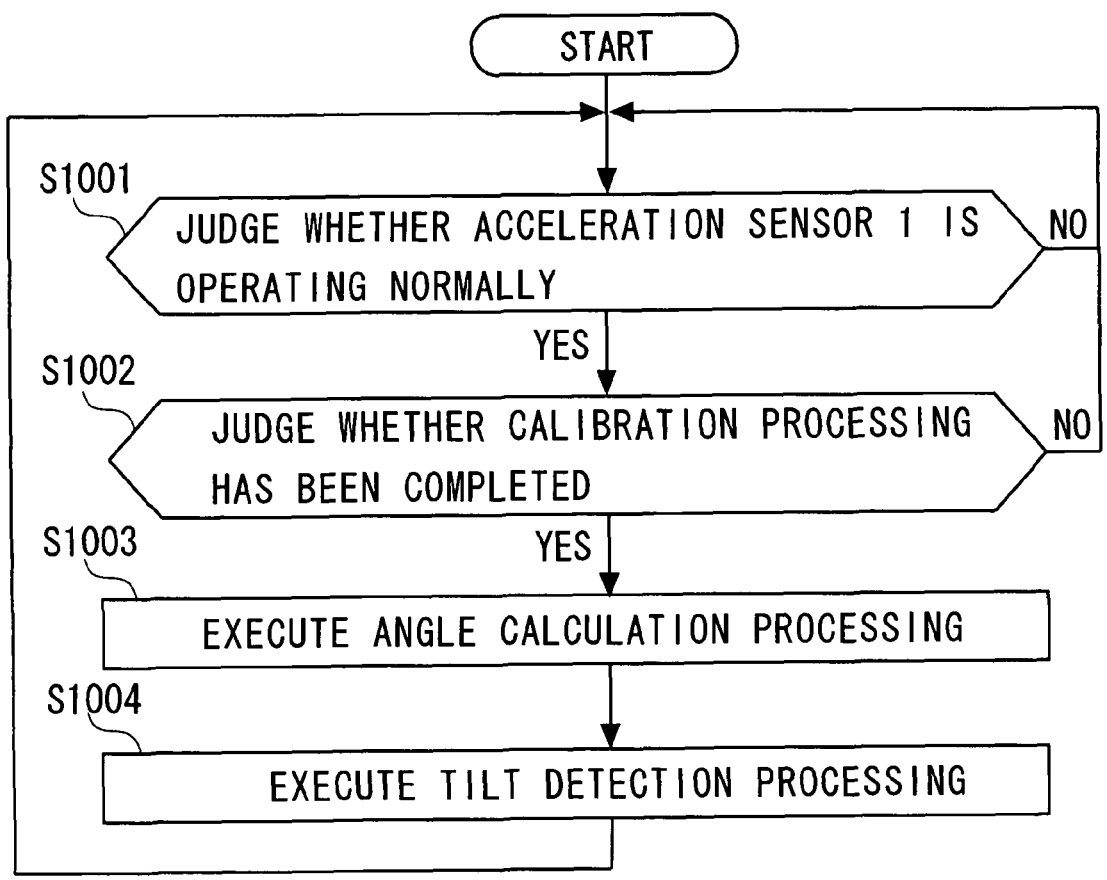
FIG. 10 is a flow chart illustrating angle calculation processing and tilt detection processing.

Angle calculation processing and tilt detection processing according to the embodiment will be described. FIG. 10 is a flow chart illustrating the angle calculation processing and the tilt detection processing. The angle calculation processing and the tilt detection processing are performed without interruption at given intervals.

First, the processing unit 204 judges whether the acceleration sensor 1 is operating normally (S1001). Specifically, the processing unit 204 judges whether there is a sensor error flag set in the register 209. A sensor error flag set in the register 209 indicates that the acceleration sensor 1 is not operating normally.

When the acceleration sensor 1 is not operating properly, in other words, when a sensor error flag is found in the register 209, the processing unit 204 performs the processing of S1001 again after a given period of time elapses.

When the acceleration sensor 1 is operating properly, in other words, when no sensor error flag is found in the register 209, the processing unit 204 judges that the calibration processing has been completed (S1002). Specifically, the processing unit 204 judges whether there is a calibration status flag set in the register 209. A calibration status flag set in the register 209 indicates the completion of the calibration processing.

In the case where the calibration processing has been completed, in other words, when a calibration status flag is found in the register 209, the processing unit 204 performs the angle calculation processing (S1003). In the case where the calibration processing has not been completed, in other words, when no calibration status flag is found in the register 209, the processing unit 204 performs the processing of S1001 after a given period of time elapses.

The processing unit 204 then performs the tilt detection processing (S1004). After a given period of time since the execution of the tilt detection processing, the processing unit 204 performs the processing of S1001 again.

Figure 11:
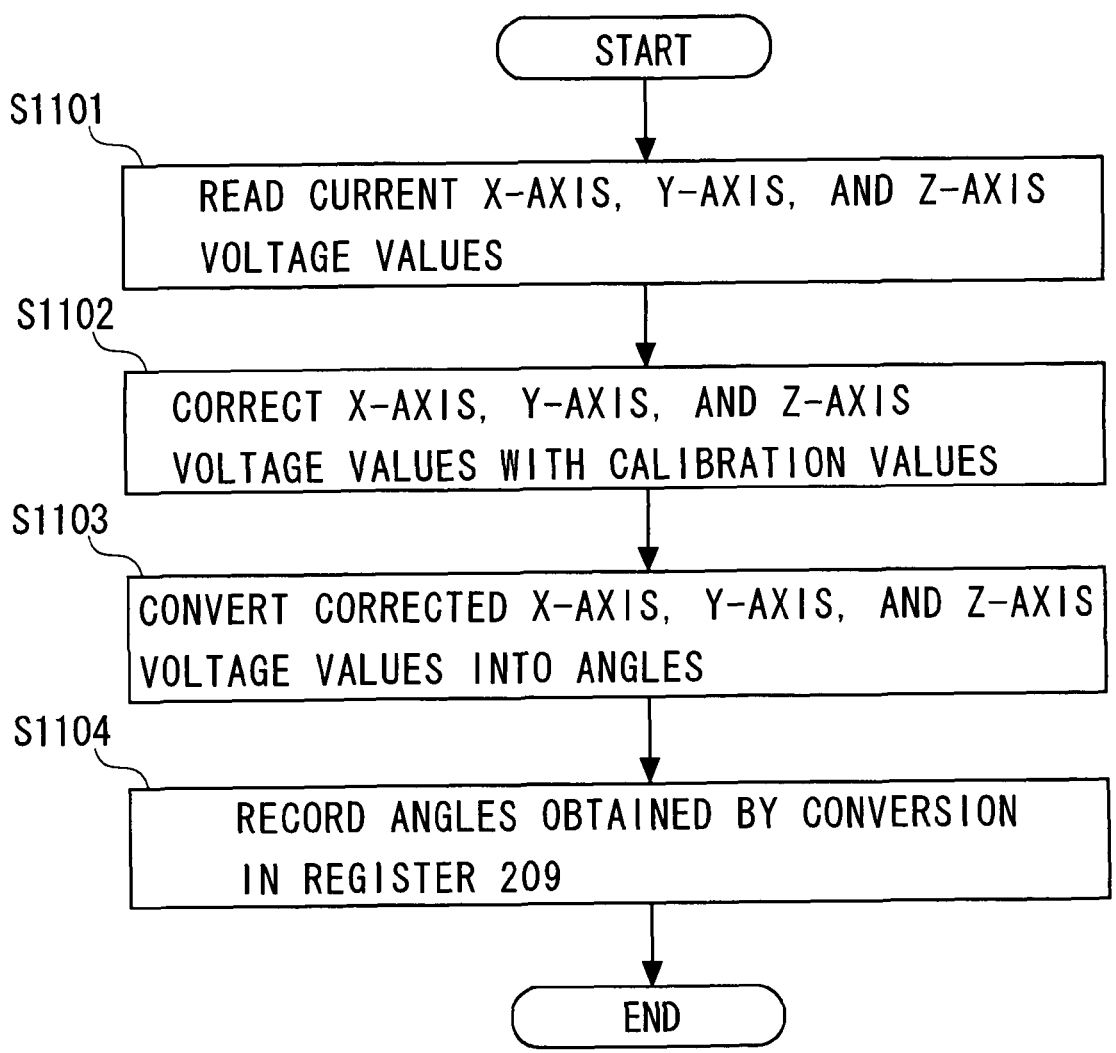
FIG. 11 is a flow chart illustrating the angle calculation processing.

FIG. 11 illustrates the angle calculation processing (processing of S1003 of FIG. 10). The angle calculation processing is processing of calculating the current posture of the acceleration sensor 1, namely, processing of calculating the current angle of the acceleration sensor 1 with respect to the direction of gravity.

First, the processing unit 204 reads X-axis, Y-axis, and Z-axis voltage values that are currently output by the acceleration sensor 1 (S1101). Next, the processing unit 204 corrects the read X-axis, Y-axis, and Z-axis voltage values with the calibration values recorded in the NV-ROM 206 (S1102). Specifically, the processing unit 204 adds the X-axis calibration value, the Y-axis calibration value, and the Z-axis calibration value to the read X-axis voltage value, Y-axis voltage value, and Z-axis voltage value, respectively.

The processing unit 204 converts the X-axis voltage value corrected with the X-axis calibration value, the Y-axis voltage value corrected with the Y-axis calibration value, and the Z-axis voltage value corrected with the Z-axis calibration value into angles (S1103). In this case, angles into which the processing unit 204 converts the corrected voltage values are angles formed with respect to the direction of gravity.

The processing unit 204 separately records the X-axis, Y-axis, and Z-axis angles obtained by the conversion in the register 209 (S1104). The X-axis angle is recorded at GP-X of the register 209. The Y-axis angle is recorded at GP-Y of the register 209. The Z-axis angle is recorded at GP-Z of the register 209. The processing unit 204 then ends the angle calculation processing.

Figure 12:
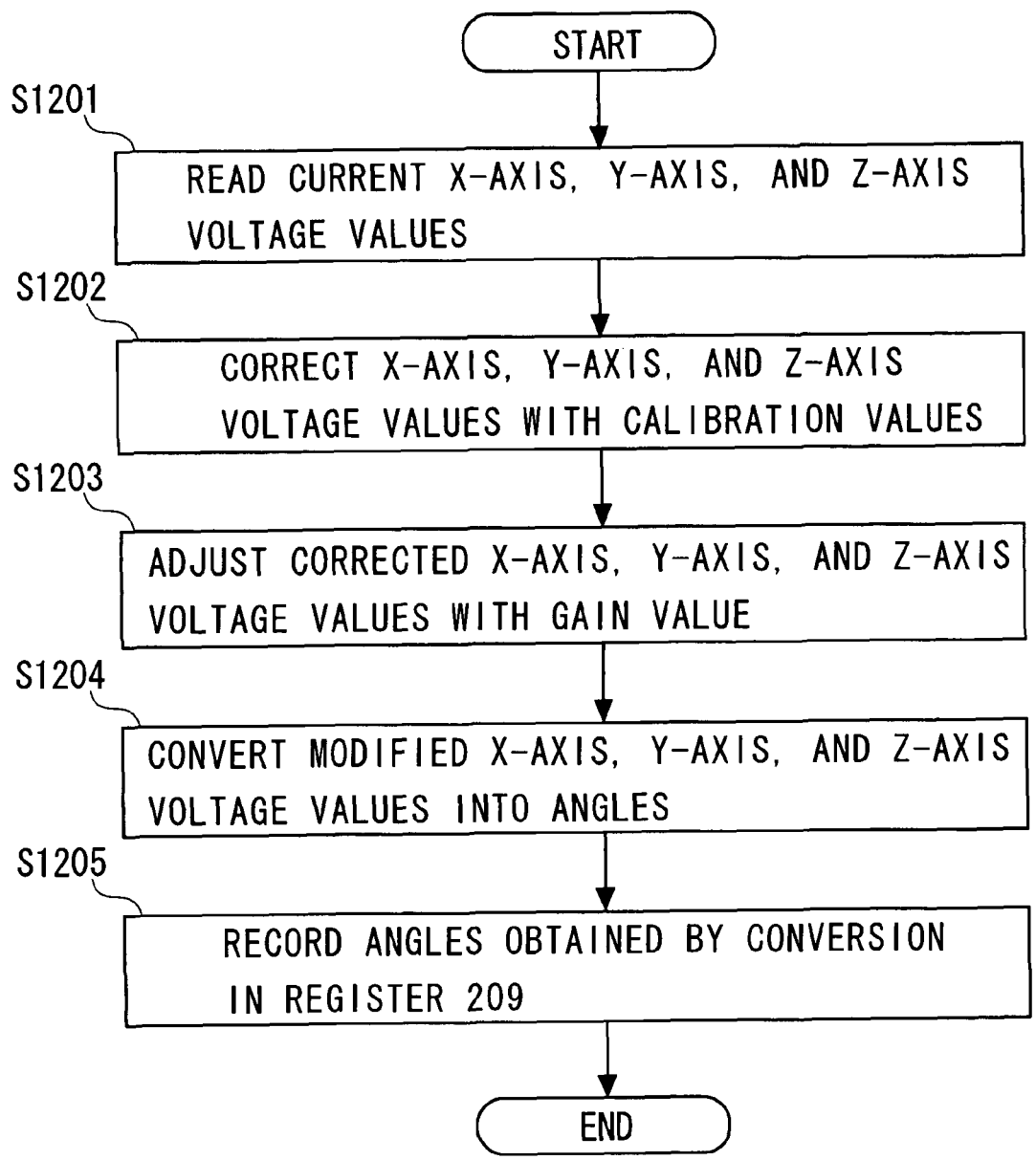
FIG. 12 is a flow chart illustrating angle calculation processing that incorporates GAIN processing.

Two acceleration sensors 1 of different types output different voltage values when the same accelerated velocity is applied. In order to adjust voltage value differences among different types of the acceleration sensor 1, GAIN processing is executed. FIG. 12 illustrates the angle calculation processing (processing of S1003 of FIG. 10) that incorporates GAIN processing.

First, the processing unit 204 reads X-axis, Y-axis, and Z-axis voltage values that are currently output by the acceleration sensor 1 (S1201). Next, the processing unit 204 corrects the read X-axis, Y-axis, and Z-axis voltage values with the calibration values recorded in the NV-ROM 206 (S1202). Specifically, the processing unit 204 adds the X-axis calibration value, the Y-axis calibration value, and the Z-axis calibration value to the read X-axis voltage value, Y-axis voltage value, and Z-axis voltage value, respectively.

The processing unit 204 then uses a GAIN value recorded in the register 209 to adjust the voltage values that have been corrected with the calibration values (S1203) Specifically, the processing unit 204 multiplies the X-axis voltage value corrected with the X-axis calibration value by the GAIN value. The processing unit 204 also multiplies the Y-axis voltage value corrected with the Y-axis calibration value by the GAIN value. The processing unit 204 further multiplies the Z-axis voltage value corrected with the Z-axis calibration value by the GAIN value. In this case, the GAIN value is a value specific to the type of the acceleration sensor 1 that is mounted to the information processing device. For instance, 0.9 is used as a GAIN value for an acceleration sensor 1A whereas 1.1 is used as a GAIN value for an acceleration sensor 1B. The GAIN value is obtained in advance for each type of the acceleration sensor 1.

The processing unit 204 converts the X-axis voltage value, Y-axis voltage value, and Z-axis voltage value adjusted with the GAIN value into angles (S1204). In this case, angles into which the processing unit 204 converts the adjusted voltage values are angles formed with respect to the direction of gravity.

The processing unit 204 separately records the X-axis, Y-axis, and Z-axis angles obtained by the conversion in the register 209 (S1205). The X-axis angle is recorded at GP-X of the register 209. The Y-axis angle is recorded at GP-Y of the register 209. The Z-axis angle is recorded at GP-Z of the register 209. The processing unit 204 then ends the angle calculation processing that incorporates GAIN processing.

Figure 13:
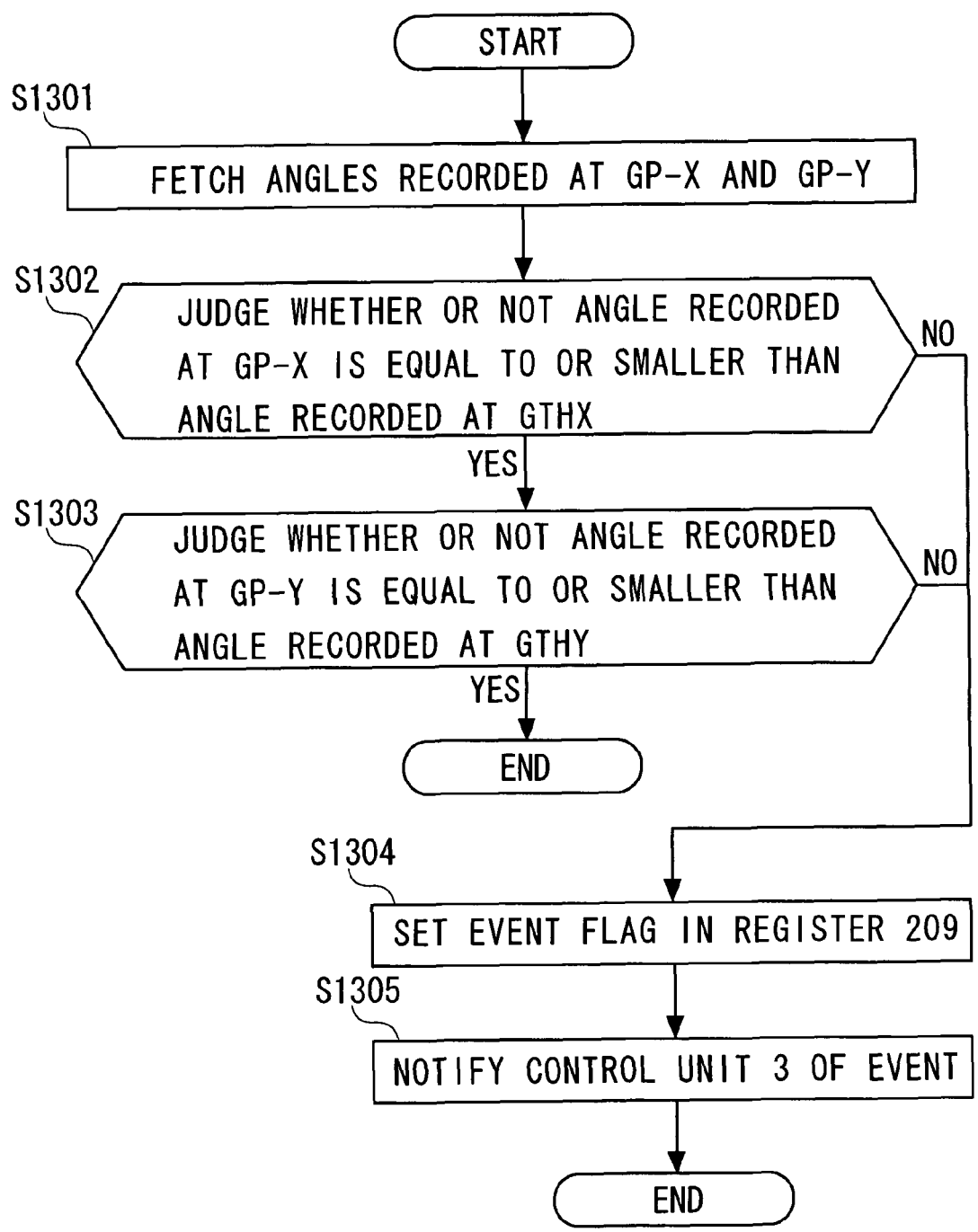
FIG. 13 is a flow chart illustrating the tilt detection processing.

FIG. 13 illustrates the tilt detection processing (processing of S1004 of FIG. 10). First, the processing unit 204 fetches the angles recorded at GP-X and GP-Y of the register 209 (S1301). Next, the processing unit 204 judges whether or not the angle recorded at GP-X of the register 209 is equal to or smaller than an angle recorded at GTHX of the register 209 (S1302).

When the angle recorded at GP-X of the register 209 is equal to or smaller than the angle recorded at GTHX of the register 209, the processing unit 204 judges whether or not the angle recorded at GP-Y of the register 209 is equal to or smaller than an angle recorded at GTHY of the register 209 (S1303).

When the angle recorded at GP-Y of the register 209 is equal to or smaller than the angle recorded at GTHY of the register 209, the processing unit 204 ends the tilt detection processing.

On the other hand, when the angle recorded at GP-X of the register 209 is larger than an angle recorded at GTHX of the register 209 (when answer is "No" in processing of S1302), the processing unit 204 sets an event flag in the register 209 (S1304).

The processing unit 204 then notifies the control unit 3 of the event (S1305). When the angle recorded at GP-Y of the register 209 is larger than an angle recorded at GTHY of the register 209 (when answer is "No" in processing of S1303), the processing unit 204 performs the processing of S1304.

Angles that serve as the reference for changing the operating state of the information processing device are set to GTHX and GTHY of the register 209. The processing unit 204 sends an event to the control unit 3 when the acceleration sensor 1 is tilted by a given value or more. The control unit 3 can thus change the operating state of the information processing device when an event notification is received.

<Self-Diagnostic Processing>

Self-diagnostic processing is executed by having the processing unit 204 read a self-diagnostic processing program, which is recorded in the NV-ROM 205. A self-diagnostic driver 210A is an output device for forcefully turning a voltage value that enters the A/D converter 208 via the signal line 10A into a high voltage value or a low voltage value. A self-diagnostic driver 210B is an output device for forcefully turning a voltage value that enters the A/D converter 208 via the signal line 10B into a high voltage value or a low voltage value. A self-diagnostic driver 210C is an output device for forcefully turning a voltage value that enters the A/D converter 208 via the signal line 10C into a high voltage value or a low voltage value. In the following description, the term "self-diagnostic driver 210" encompasses all of the self-diagnostic driver 210A, the self-diagnostic driver 210B, and the self-diagnostic driver 210C.

A voltage value to which the self-diagnostic driver 210 forcefully boosts a voltage value that enters the A/D converter 208 is called a high power level voltage value. A voltage value to which the self-diagnostic driver 210 forcefully drops a voltage value that enters the A/D converter 208 is called a low power level voltage value. The high power level voltage value and the low power level voltage value are high enough or low enough to be distinguished from voltage values that are output from the acceleration sensor 1. In other words, the high power level voltage value and the low power level voltage value are outside of the range of voltage values that the acceleration sensor 1 can output.

The processing unit 204 can control the drive of the self-diagnostic driver 210 such that a voltage value entering the A/D converter 208 has the high power level voltage value or the low power level voltage value. When the drive of the self-diagnostic driver 210 is controlled such that the high power level voltage value enters the A/D converter 208, the processing unit 204 sets DIAGBIT1 of the self-diagnosis control register 211. When the drive of the self-diagnostic driver 210 is controlled such that the high power level voltage value enters the A/D converter 208, the processing unit 204 resets DIAGBIT1 of the self-diagnosis control register 211. The self-diagnosis control register 211 has DIAGBIT1 for each of the self-diagnostic driver 210A, the self-diagnostic driver 210B, and the self-diagnostic driver 210C.

The processing unit 204 is also capable of controlling the voltage value output of the self-diagnostic driver 210. By pulling the self-diagnostic driver 210 out of its high-impedance state, the processing unit 204 puts the self-diagnostic driver 210 into an output state. To place the self-diagnostic driver 210 in an output state, the processing unit 204 sets DIAGBIT2 of the self-diagnosis control register 211. The processing unit 204 puts the self-diagnostic driver 210 in an output cessation state by pushing the self-diagnostic driver 210 into a high-impedance state. To place the self-diagnostic driver 210 in an output cessation state, the processing unit 204 resets DIAGBIT2 of the self-diagnosis control register 211. The processing unit 204 usually keeps the self-diagnostic driver 210 in an output cessation state. The self-diagnosis control register 211 has DIAGBIT2 for each of the self-diagnostic driver 210A, the self-diagnostic driver 210B, and the self-diagnostic driver 210C.

Figure 15:
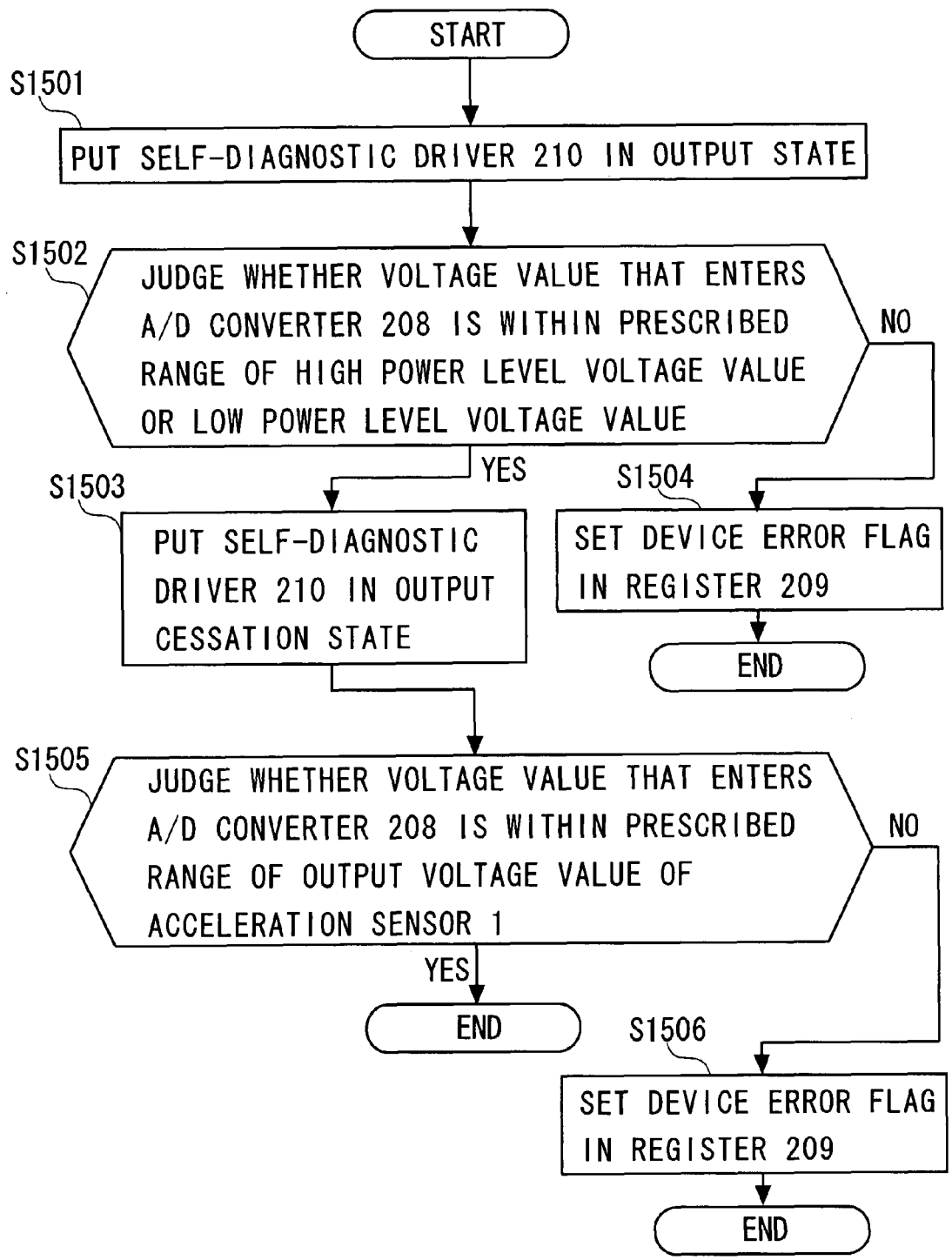
FIG. 15 is a flow chart illustrating self-diagnostic processing.

FIG. 15 is a flow chart illustrating the self-diagnostic processing. The processing unit 204 controls the drive of the self-diagnostic driver 210 to put the self-diagnostic driver 210 in an output state (S1501) In this step, the processing unit 204 controls the drive of the self-diagnostic driver 210 such that a voltage value entering the A/D converter 208 is the high power level voltage value or the low power level voltage value.

Next, the processing unit 204 judges whether or not the voltage value entering the A/D converter 208 is within a prescribed range of the high power level voltage value or the low power level voltage value (S1502). The voltage value entering the A/D converter 208 is within the prescribed range of the high power level voltage value or the low power level voltage value when the signal line 10 is in a normal state. In other words, when the signal line 10 is disconnected, short-circuited, or otherwise damaged, the voltage value entering the A/D converter 208 is outside of the prescribed range of the high power level voltage value or the low power level voltage value. The prescribed range of the high power level voltage value or the low power level voltage value is obtained in advance through experiments or simulation.

In a case where the voltage value entering the A/D converter 208 is within the prescribed range of the high power level voltage value or the low power level voltage value, the processing unit 204 controls the drive of the self-diagnostic driver 210 to move the self-diagnostic driver 210 from an output state to an output cessation state (S1503). In a case where the voltage value entering the A/D converter 208 is not within the prescribed range of the high power level voltage value or the low power level voltage value, on the other hand, the processing unit 204 sets a device error flag in the register 209 (S1504). The processing unit 204 ends the self-diagnostic processing at this point. Then the processing unit 204 may control the self-diagnostic driver 210 to move the self-diagnostic driver 210 from an output state to an output cessation state.

Next, the processing unit 204 judges whether the voltage value entering the A/D converter 208 is within a prescribed range of an output voltage value of the acceleration sensor 1 (S1505). The output voltage value of the acceleration sensor 1 is a voltage value that the acceleration sensor 1 outputs during its normal operation. In S1505, the processing unit 204 makes a judgment within a given period of time. The processing unit 204 measures, using a not-shown timer, the time elapsed since the self-diagnostic driver 210 is controlled and moved from an output state to an output cessation state. The given period of time can be set arbitrarily.

The voltage value entering the A/D converter 208 is within the prescribed range of the output voltage value of the acceleration sensor 1 when the acceleration sensor 1 is in a normal state. In other words, the voltage value entering the A/D converter 208 is outside of the prescribed range of the output voltage value of the acceleration sensor 1 when the acceleration sensor 1 is malfunctioning. The prescribed range of the output voltage value of the acceleration sensor 1 is obtained in advance through experiments or simulation.

In a case where the voltage value entering the A/D converter 208 is within the prescribed range of the output voltage value of the acceleration sensor 1, the processing unit 204 ends the self-diagnostic processing.

In a case where the voltage value entering the A/D converter 208 is not within the prescribed range of the output voltage value of the acceleration sensor 1, the processing unit 204 sets a device error flag in the register 209 (S1506). The processing unit 204 then ends the self-diagnostic processing.

Through the self-diagnostic processing, the information processing device can check whether the acceleration sensor 1 and the signal line 10 are in a normal state, in other words, whether the acceleration sensor 1 and the MCU 2 are connected properly. The self-diagnostic processing also enables the information processing device to check whether the acceleration sensor 1 is operating properly. The self-diagnostic processing can also be used to check whether the signal line 10 is connected properly and whether or not the signal line 10 is disconnected, short-circuited, or otherwise damaged. As a result, the information processing device can check whether the A/D converter 208 is in a normal state, in other words, whether the A/D converter 208 is connected properly, as well as whether the A/D converter 208 is operating properly.

Figure 16:
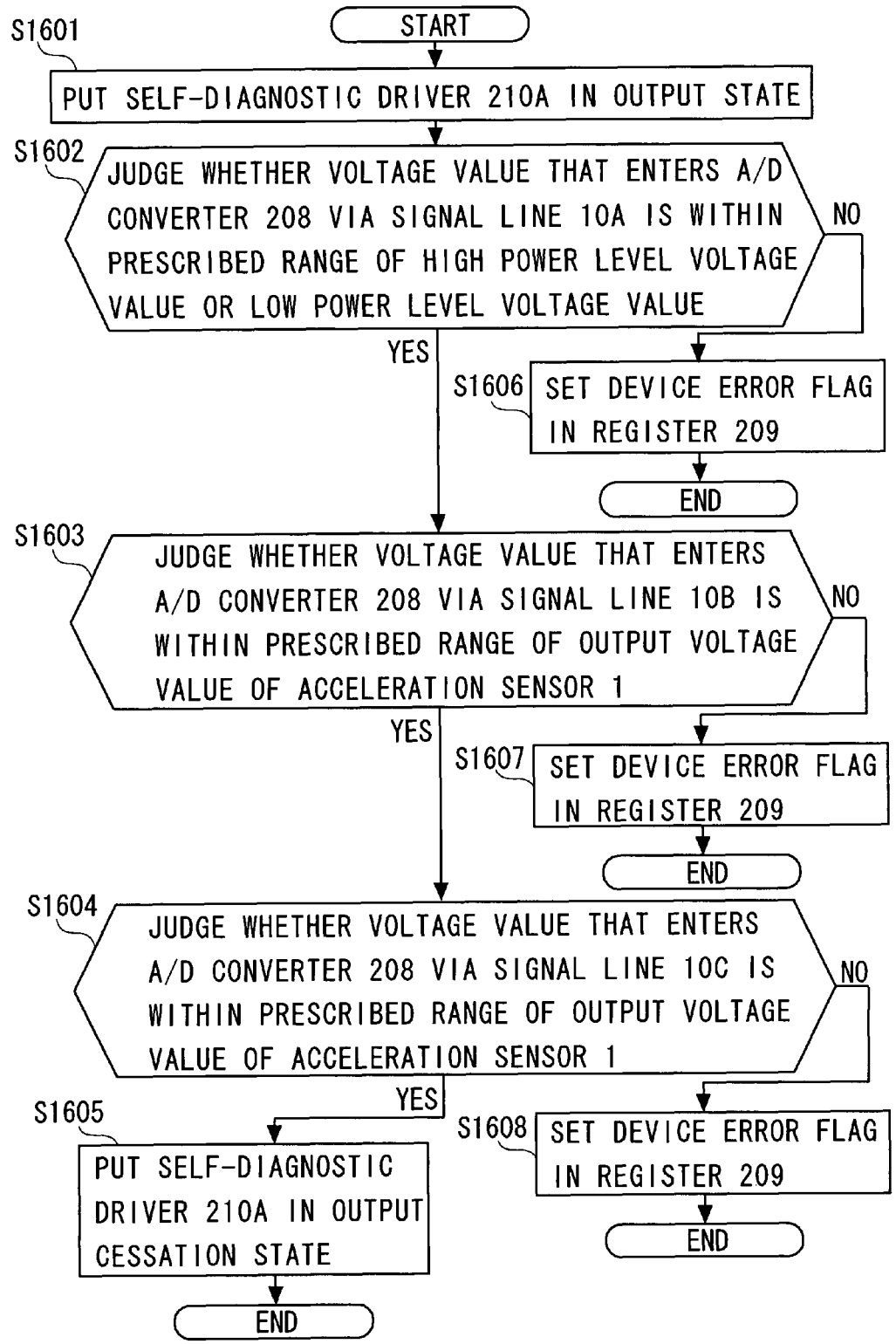
FIG. 16 is a flow chart illustrating self-diagnostic processing performed separately for a signal line 10A, a signal line 10B, and a signal line 10C.

Described next with reference to FIG. 16 is a case in which self-diagnostic processing is performed separately for the signal line 10A, the signal line 10B, and the signal line 10C. In this processing, the processing unit 204 controls the drive of the self-diagnostic driver 210A, the self-diagnostic driver 210B, and the self-diagnostic driver 210C individually. FIG. 16 therefore illustrates processing of when the self-diagnostic driver 210A is put in an output state as a representative of the other two self-diagnostic drivers.

The processing unit 204 controls the drive of the self-diagnostic driver 210A to put the self-diagnostic driver 210A in an output state (S1601). The processing unit 204 in this step controls the drive of the self-diagnostic driver 210A such that a voltage value entering the A/D converter 208 has the high power level voltage value or the low power level voltage value.

Next, the processing unit 204 judges whether a voltage value that enters the A/D converter 208 via the signal line 10A is within a prescribed range of the high power level voltage value or the low power level voltage value (S1602).

In a case where the voltage value that enters the A/D converter 208 via the signal line 10A is within the prescribed range of the high power level voltage value or the low power level voltage value, the processing unit 204 judges whether a voltage value that enters the A/D converter 208 via the signal line 10B is within a prescribed range of the output voltage value of the acceleration sensor 1 (S1603).

A voltage value that enters the A/D converter 208 is within a prescribed range of the high power level voltage value or the low power level voltage value when the signal line 10A is in a normal state. In other words, a voltage value that enters the A/D converter 208 is outside a prescribed range of the high power level voltage value or the low power level voltage value when the signal line 10A is disconnected, short-circuited, or otherwise damaged. The prescribed range of the value of the high power level voltage value or the low power level voltage value that enters the A/D converter 208 via the signal line 10A is obtained in advance through experiments or simulation.

In a case where the voltage value that enters the A/D converter 208 via the signal line 10B is within the prescribed range of the output voltage value of the acceleration sensor 1, the processing unit 204 judges whether a voltage value that enters the A/D converter 208 via the signal line 10C is within the prescribed range of the output voltage value of the acceleration sensor 1 (S1604).

When the voltage value that enters the A/D converter 208 via the signal line 10B is within the prescribed range of the output voltage value of the acceleration sensor 1, it means that the section between the signal line 10A and the signal line 10B is not short-circuited. In other words, a voltage value that enters the A/D converter 208 via the signal line 10B is within a prescribed range of the high power level voltage value or the low power level voltage value when the section between the signal line 10A and the signal line 10B is short-circuited. The processing unit 204 can thus detect whether the section between the signal line 10A and the signal line 10B is short-circuited.

In a case where the voltage value that enters the A/D converter 208 via the signal line 10C is within the prescribed range of the output voltage value of the acceleration sensor 1, the processing unit 204 controls the drive of the self-diagnostic driver 210A to move the self-diagnostic driver 210A from an output state to an output cessation state (S1605). The processing unit 204 then ends the processing of when the self-diagnostic driver 210A is put in an output state.

When the voltage value that enters the A/D converter 208 via the signal line 10C is within the prescribed range of the output voltage value of the acceleration sensor 1, it means that the section between the signal line 10A and the signal line 10C is not short-circuited. In other words, a voltage value that enters the A/D converter 208 via the signal line 10C is within a prescribed range of the high power level voltage value or the low power level voltage value when the section between the signal line 10A and the signal line 10C is short-circuited. The processing unit 204 can thus detect whether the section between the signal line 10A and the signal line 10C is short-circuited.

In a case where the voltage value that enters the A/D converter 208 via the signal line 10A is outside the prescribed range of the high power level voltage value or the low power level voltage value (when answer is "No" in processing of S1602), the processing unit 204 sets a device error flag in the register 209 (S1606). The processing unit 204 ends the self-diagnostic processing at this point. Then the processing unit 204 may control the self-diagnostic driver 21A to move the self-diagnostic driver 210A from an output state to an output cessation state.

In a case where the voltage value that enters the A/D converter 208 via the signal line 10B is outside the prescribed range of the output voltage value of the acceleration sensor 1 (when answer is "No" in processing of S1603), the processing unit 204 sets a device flag error in the register 209 (S1607). The processing unit 204 ends the self-diagnostic processing at this point. Then the processing unit 204 may control the self-diagnostic driver 210A to move the self-diagnostic driver 210A from an output state to an output cessation state.

In a case where the voltage value that enters the A/D converter 208 via the signal line 10C is outside the prescribed range of the output voltage value of the acceleration sensor 1 (when answer is "No" in processing of S1604), the processing unit 204 sets a device flag error in the register 209 (S1608). The processing unit 204 ends the self-diagnostic processing at this point. Then the processing unit 204 may control the self-diagnostic driver 210A to move the self-diagnostic driver 210A from an output state to an output cessation state.

The processing unit 204 can thus detect whether the section between the signal line 10A and the signal line 10B is short-circuited, and whether the section between the signal line 10A and the signal line 10C is short-circuited.

However, in some cases, a short circuit between the signal line 10B and the signal line 10C makes the voltage value that enters the A/D converter 208 via the signal line 10B equal to the voltage value that enters the A/D converter 208 via the signal line 10C. For instance, when disconnection of the signal line 10B causes a short circuit between the signal line 10B and the signal line 10C at a point nearer to the A/D converter 208 than to the disconnection point of the signal line 10B, the voltage value that enters the A/D converter 208 via the signal line 10B is equal to the voltage value that enters the A/D converter 208 via the signal line 10C. Consequently, the processing unit 204 cannot detect the disconnection of the signal line 10B.

To avoid this, the processing unit 204 controls the drive of the self-diagnostic driver 210B and puts the self-diagnostic driver 210B in an output state. The processing unit 204 then performs processing of when the self-diagnostic driver 210B is put in an output state in a manner similar to the processing shown in FIG. 16, except that the self-diagnostic driver 210A in the processing of FIG. 16 is replaced by the self-diagnostic driver 210B, the self-diagnostic driver 210B of FIG. 16 is replaced by the self-diagnostic driver 210A, the signal line 10A of FIG. 16 is replaced by the signal line 10B, and the signal line 10B of FIG. 16 is replaced by the signal line 10A.

The processing unit 204 controls the drive of the self-diagnostic driver 210C and puts the self-diagnostic driver 210C in an output state. The processing unit 204 then performs processing of when the self-diagnostic driver 210C is put in an output state in a manner similar to the processing shown in FIG. 16, except that the self-diagnostic driver 210A in the processing of FIG. 16 is replaced by the self-diagnostic driver 210C, the self-diagnostic driver 210C of FIG. 16 is replaced by the self-diagnostic driver 210A, the signal line 10A of FIG. 16 is replaced by the signal line 10C, and the signal line 10C of FIG. 16 is replaced by the signal line 10A.

The processing unit 204 performs the processing of separately putting the self-diagnostic driver 210A, the self-diagnostic driver 210B, and the self-diagnostic driver 210C in an output state in this manner. The processing unit 204 can thus detect which of the signal line 10A, the signal line 10B, and the signal line 10C is disconnected. This processing also enables the processing unit 204 to detect whether the sections between the signal line 10A and the signal line 10B is short-circuited, whether the section between the signal line 10A and the signal line 10C is short-circuited, and whether the section between the signal line 10B and the signal line 10C is short-circuited.

The self-diagnostic processing can be executed concurrently with the calibration processing. Specifically, the calibration processing and the self-diagnostic processing are executed at the press of the calibration button provided by the operating system interface 502. In a case where the self-diagnostic processing is executed concurrently with the calibration processing, the processing unit 204 may prevent the calibration processing from being finished before the self-diagnostic processing is completed. Alternatively, the processing unit 204 may end the calibration processing at the time when the processing unit 204 sets a device error flag in the register 209 in the self-diagnostic processing.

The self-diagnostic processing can be carried out without the self-diagnosis detection resistor 6 shown in FIG. 2. With the self-diagnosis detection resistor 6 omitted, the processing unit 204 may perform the self-diagnostic processing in place of the processing of S903 to S905 of FIG. 9. In this case, the processing unit 204 performs the self-diagnostic processing after the processing of S902 in FIG. 9, and after the self-diagnostic processing is finished, may execute the processing of S906. Employing a configuration that omits the self-diagnosis detection resistor 6 shown in FIG. 2 makes it possible to reduce error resulting from a fluctuation (production tolerance) between the impedance of the output resistor 4 and the resistance value of the self-diagnosis detection resistor 6 in FIG. 2. As a result, measurement of even higher precision is achieved.

Modification Example

A measure to obtain an accelerated velocity that is applied to an acceleration sensor and a measure to obtain the angle of the acceleration sensor have been described in the embodiment. This modification example describes a measure to obtain an accelerated velocity that is applied to an acceleration sensor with higher precision and a measure to obtain the angle of the acceleration sensor with higher precision.

Figure 17:
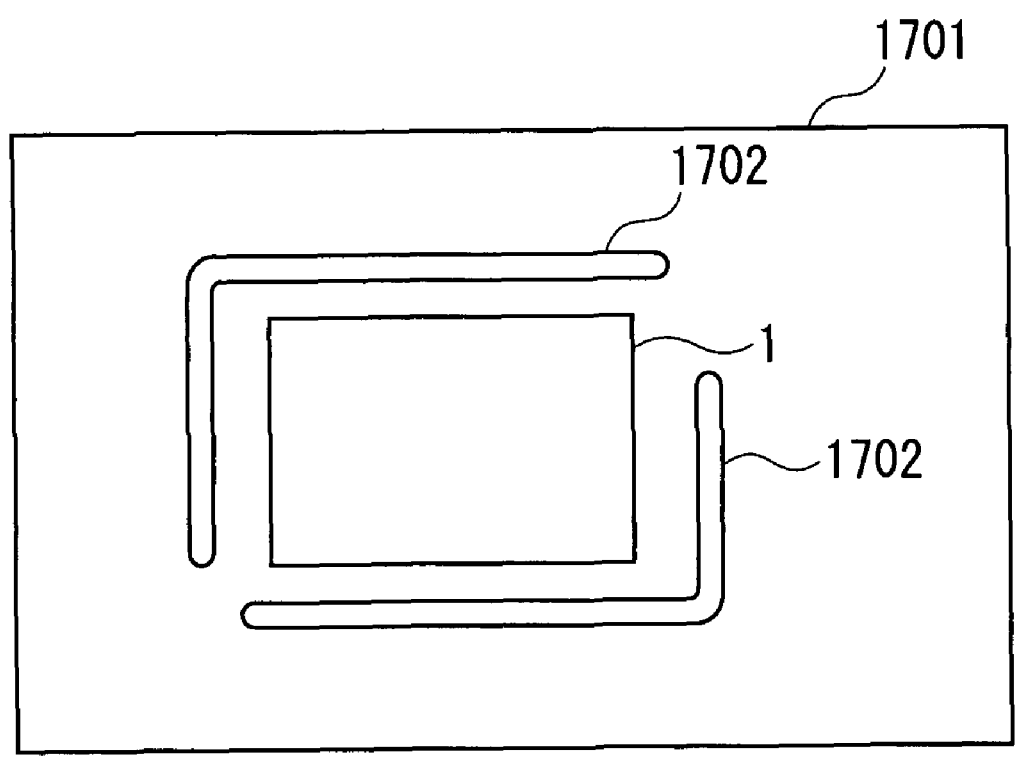
FIG. 17 is a diagram showing a substrate 1701 which has the acceleration sensor 1 of the embodiment.

FIG. 17 is a diagram showing a substrate 1701, which has the acceleration sensor 1. As shown in FIG. 17, the substrate 1701 has a pair of substantially L-shaped slits 1702, which are arranged to form a substantially rectangular shape. The acceleration sensor 1 is placed inside the rectangle of the slits 1702. The paired slits 1702 are positioned on the substrate 1701 such that the sides of the rectangle do not overlap. The slits 1702 are symmetrically arranged on the substrate 1701. The sides of the rectangle formed by the slits 1702 on the substrate 1701 are at given distances from the acceleration sensor 1. The slits 1702 are approximately L-shaped cuts in the substrate 1701. The paired slits 1702 in the substrate 1701 absorb stress applied to the acceleration sensor 1. Stress on the acceleration sensor 1 that is caused by residual stress of the information processing device to which the acceleration sensor 1 is mounted is thus lessened.

<Computer Readable Recording Medium>

It is possible to record a program which causes a computer to implement any of the functions described above on a computer readable recording medium. By causing the computer to read in the program from the recording medium and execute it, the function thereof can be provided. The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM (Read Only Memory).

<Others>

The disclosures of Japanese patent application No. JP2006-055327 filed on Mar. 1, 2006 including the specification, drawings and abstract are incorporated herein by reference.

What is claimed is:

1. An information processing device, which is connected to an acceleration sensor to detect an accelerated velocity along at least one axis, comprising:
- a correction instruction input unit in which a correction instruction from a user is entered;
- an acceleration measuring unit which uses the acceleration sensor in response to the correction instruction to obtain, more than once, a measurement value about an accelerated velocity that is applied to the information processing device along at least one axis;
- a measurement value judging unit which judges whether the measurement values about the accelerated velocity obtained through measurement by the acceleration measuring unit are within a specific range;
- a correction value creating unit which, when the measurement values about the accelerated velocity are judged to be within the specific range by the measurement value judging unit, creates a correction value for the acceleration sensor based on the measurement values about the accelerated velocity; and
- a correcting unit which corrects the measurement values about the accelerated velocity with the correction value.

2. The information processing device according to claim 1, further comprising a maximum value judging unit which judges whether or not the measurement values are equal to or smaller than a first value.

3. The information processing device according to claim 1, further comprising a minimum value judging unit which judges whether or not the measurement values are equal to or larger than a second value.

4. An information processing device according to claim 1, further comprising a self-diagnostic driver which applies a voltage to a connection line that connects the acceleration sensor and the information processing device.

5. A correction method of correcting an information processing device, which is connected to an acceleration sensor to detect an accelerated velocity along at least one axis, comprising:
- accepting a correction instruction from a user;
- using the acceleration sensor in accordance with the correction instruction to obtain, more than once, a measurement value about an accelerated velocity that is applied to the information processing device along at least one axis;
- judging whether the measurement values are within a specific range;
- creating, when the measurement values about the accelerated velocity are judged to be within the specific range, a correction value for the acceleration sensor based on the measurement values about the accelerated velocity; and
- correcting the measurement values about the accelerated velocity with the correction value.

6. The correction method according to claim 5, further comprising judging whether or not the measurement values are equal to or smaller than a first value.

7. The correction method according to claim 5, further comprising judging whether or not the measurement values are equal to or larger than a second value.

8. The correction method according to claim 5, further comprising making a self-diagnosis with a use of a self-diagnostic driver which applies a voltage to a connection line that connects the acceleration sensor and the information processing device.

9. A readable-by-computer medium recorded with a correction program for causing a computer, which is connected to an acceleration sensor to detect an accelerated velocity along at least one axis, to execute:
- accepting a correction instruction from a user;
- using the acceleration sensor in accordance with the correction instruction to obtain, more than once, a measurement value about an accelerated velocity that is applied to the information processing device along at least one axis;
- judging whether the measurement values are within a specific range;
- creating, when the measurement values about the accelerated velocity are judged to be within the specific range, a correction value for the acceleration sensor based on the measurement values about the accelerated velocity; and
- correcting the measurement values about the accelerated velocity with the correction value.

10. The readable-by-computer medium recorded with a correction program according to claim 9, further comprising judging whether or not the measurement values are equal to or smaller than a first value.

11. The readable-by-computer medium recorded with a correction program according to claim 9, further comprising judging whether or not the measurement values are equal to or larger than a second value.

12. The readable-by-computer medium recorded with a correction program according to claim 9, further comprising making a self-diagnosis with the use of a self-diagnostic driver which applies a voltage to a connection line that connects the acceleration sensor and the information processing device.

* * * * *

UNITED STATES PATENT AND TRADEMARK OFFICE
CERTIFICATE OF CORRECTION

| | | |
|---|---|---|
| PATENT NO. | : 7,831,846 B2 | Page 1 of 1 |
| APPLICATION NO. | : 11/709247 | |
| DATED | : November 9, 2010 | |
| INVENTOR(S) | : Nobutaka Ishidera et al. | |

It is certified that error appears in the above-identified patent and that said Letters Patent is hereby corrected as shown below:

Column 21, Line 33 in Claim 4, delete "An" and insert -- The --, therefor.

Signed and Sealed this
First Day of February, 2011

David J. Kappos
*Director of the United States Patent and Trademark Office*